(12) United States Patent
Waugh

(10) Patent No.: US 11,138,246 B1
(45) Date of Patent: Oct. 5, 2021

(54) PROBABILISTIC INDEXING OF TEXTUAL DATA

(71) Applicant: Amazon Technologies, Inc., Seattle, WA (US)

(72) Inventor: Robert Mark Waugh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 542 days.

(21) Appl. No.: 15/194,339

(22) Filed: Jun. 27, 2016

(51) Int. Cl.
*G06F 16/31* (2019.01)
*G06F 16/33* (2019.01)

(52) U.S. Cl.
CPC ........ *G06F 16/322* (2019.01); *G06F 16/3346* (2019.01)

(58) Field of Classification Search
CPC ............................ G06F 16/322; G06F 16/3346
USPC .......................................................... 707/797
See application file for complete search history.

(56) References Cited

U.S. PATENT DOCUMENTS

| | | | | |
|---|---|---|---|---|
| 6,661,839 B1* | 12/2003 | Ishida | .............. | G01R 31/31921 341/51 |
| 8,352,483 B1* | 1/2013 | Ramesh | .................. | G06F 16/41 707/758 |
| 2005/0144203 A1* | 6/2005 | McCallum | ................ | G06F 7/02 708/200 |
| 2009/0043767 A1* | 2/2009 | Joshi | ................. | G06F 17/30867 |
| 2012/0246133 A1* | 9/2012 | Hsu | ........................ | G06F 17/273 707/706 |
| 2013/0226885 A1* | 8/2013 | Ottaviano | ......... | G06F 17/30961 707/693 |
| 2013/0346443 A1* | 12/2013 | Kataoka | .............. | G06F 16/3331 707/769 |
| 2014/0195542 A1* | 7/2014 | Larson | .............. | G06F 16/24554 707/741 |
| 2014/0229473 A1* | 8/2014 | Mehrotra | .......... | G06F 17/30011 707/728 |
| 2015/0248449 A1* | 9/2015 | Tsirkin | .............. | G06F 17/30327 707/693 |
| 2016/0048586 A1* | 2/2016 | Lipin | ................. | G06F 17/30876 707/737 |
| 2017/0068727 A1* | 3/2017 | Rubin | ................. | G06F 16/2255 |

OTHER PUBLICATIONS

"The Fastest Way to Analyze Your Log Data," Log Management & Analysis Software Made Easy, Logentries.com, Inc. © 2016, <https://logentries.com/> [retrieved Jun. 27, 2016], 7 pages.

* cited by examiner

*Primary Examiner* — Jay A Morrison
(74) *Attorney, Agent, or Firm* — Davis Wright Tremaine LLP

(57) ABSTRACT

Techniques for searching a corpus of textual data using probabilistic data structures are described herein. The corpus of textual data is indexed using the probabilistic data structure on a piece-by-piece basis and the pieces are combined so that the textual data can be searched. The search results are returned, indicating a likelihood that the data item is in the textual data.

21 Claims, 17 Drawing Sheets

PROBABILISTIC INDEXING OF TEXTUAL DATA

BACKGROUND

Modern computer systems are frequently implemented with a large number of services, resources, modules, and applications that operate collectively on a number of host computer systems within a computing resource service provider environment. As the number of such services, resources, modules, and applications grows, the problem of tracking and maintaining such entities can grow increasingly complex. One approach to aid such tracking and maintenance of these systems is to provide logging functionality wherein each of the services, resources, modules, and applications sends log event notifications to one or more logging services within the computing resource service provider environment. These log events can then be used to, for example, schedule maintenance or prioritize system configuration changes. However, as the number of services, resources, modules, and applications increases, the number of log entries corresponding to the log events increases proportionally. Searching through a large corpus of log entries for a particular log event quickly becomes very complex, but failing to locate a particular log event can quickly lead to system failures, losses of communications, and security vulnerabilities, which can, in turn, lead to a degraded user experience for users of the services of the computing resource service provider.

BRIEF DESCRIPTION OF THE DRAWINGS

Various techniques will be described with reference to the drawings, in which.

DETAILED DESCRIPTION

Figure 1:
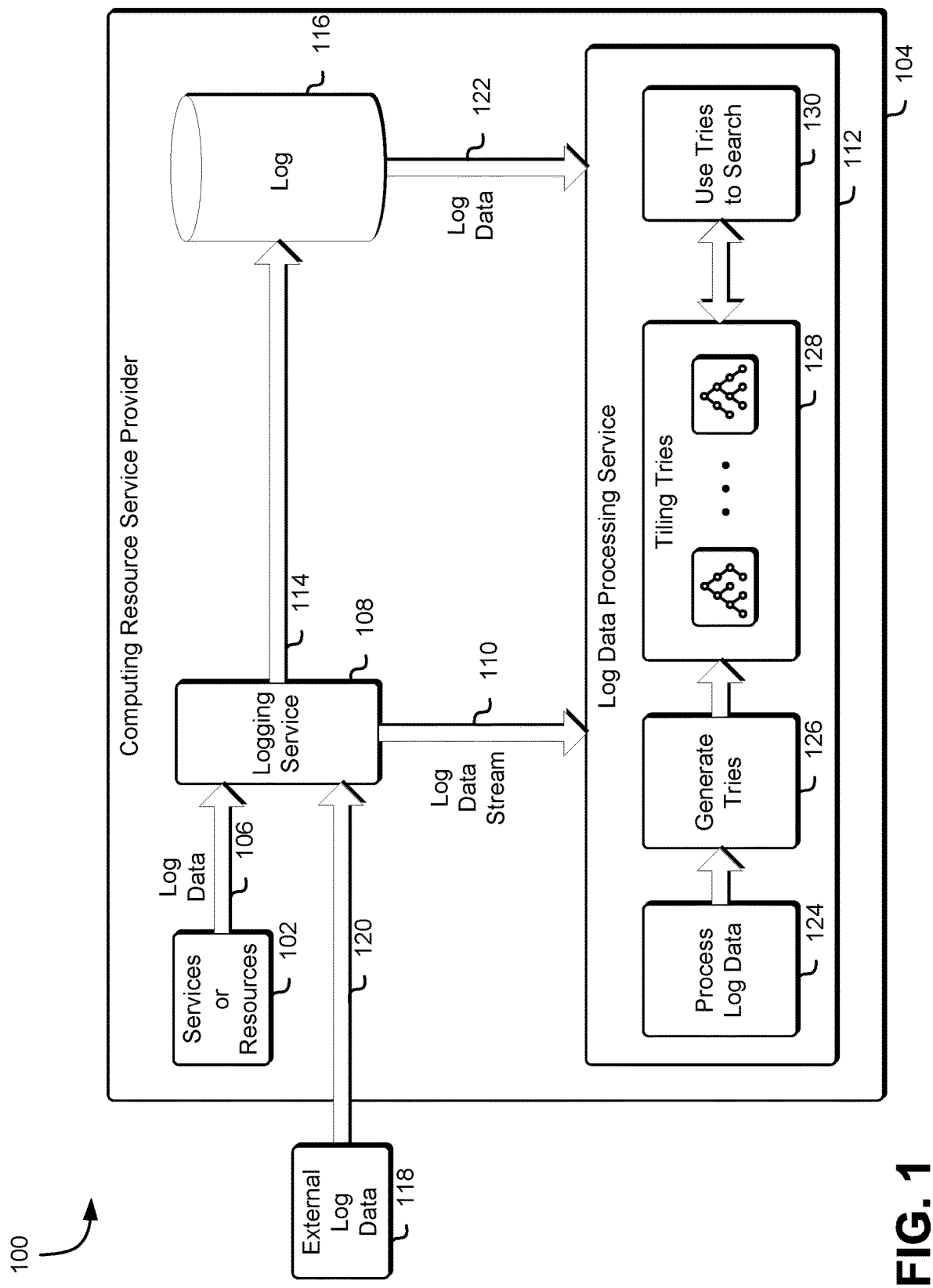
FIG. 1 illustrates an example environment where log data is indexed using tiling tries.

Searching through a large corpus of textual data for particular entries is complex when the textual data is not well-indexed. For example, locating a particular log entry within a large number of log entries, when that log entry might occur at any location within the log requires a "brute force" search when the log does not have an easily searchable index (i.e., the entire log may have to be searched). Techniques described herein describe using a probabilistic data structure such as, for example, a tiling trie, to index textual data such as log data and to provide an existence check for entries within that textual data. If the probabilistic data structure indicates that there is a high probability that an entry is located within a portion of the data, then the search space for the "brute force" search can be considerably reduced. It should be noted that, as used herein and unless clearly stated or otherwise made clear from context, the word "tries" refers to the plural of the trie data structure described herein rather than the plural of the noun "try" (i.e., an attempt) or the present indicative second person form of the verb "to try" (i.e., he/she/it tries).

The first step in indexing log data using a tiling trie is to normalize the text by, for example, removing all punctuation and changing all characters to lower case. Because a tiling trie is prefix encoded, reducing the size of the alphabet reduces the size of the corresponding trie. By normalizing the text and removing punctuation, the size of the alphabet (i.e., the characters used to represent the data) can be reduced to, for example, thirty-six or thirty-seven (twenty-six lower-case letters, ten digits, and, optionally, a space).

The log data is then decomposed log data into substrings of a predetermined length. From these substrings, a trie with a depth corresponding to the length of the substrings can be built. The data used to build the tries can be retrieved from a log or it can be received as a data stream. Building a trie corresponding to a subset of the log data such as, for example, each log entry, can generally be done efficiently in linear time as each insertion into a trie takes linear time to perform. Similarly, while the upper bound on the size of the trie is a product of the depth of the trie and the size of the alphabet, a trie built from such data is, on average, much smaller than the underlying data because language redundancy (i.e., repeated combinations of letters) reduces the size of the trie.

The tries of subsets of the log data can then be aggregated into "tiling tries" (also referred to herein as "trees of tries") by combining tries from multiple subsets into ever coarser trees of tries. Furthermore, because the trie sizes of the aggregated tiling tries are considerably smaller than the raw data due to data redundancy in the larger subsets, this space efficiency grows dramatically over larger sets of data over, for example, larger periods of time. Because the probability of false positives grows as the size of the underlying dataset grows, the coarser tiling tries may yield correspondingly less deterministic results. However by increasing the trie depth and the corresponding maximum size of the substrings extracted, the false positive metric for a particular tiling trie can be reduced. This increased-depth trie is then used to perform substring existence checks with a low false positive metric and no possibility of a false negative.

As log data streams in, characters that are not part of the alphabet (e.g., characters classified as special characters and punctuation) are removed from the log data stream and a normalized simplified string is created by, for example, converting all upper case characters to lower case. The normalized string is then added to a trie based on some chunking semantic (e.g., one or more log entries or a predetermined number of characters) and at some predetermined depth by iterating through each substring of the chunk one character at a time adding the characters from the incoming stream to the depth of the trie. Since every character in the stream will be processed a number of times corresponding to the depth of the trie (and the size of each substring), every possible substring of that length will be added to the trie.

The size, and thus the corresponding efficiency and false positive metric of the trie, can be adjusted by altering both the size of each chunk and the size of the trie depth. The trie can then be stored with the underlying data or a correlation between the trie and the underlying data (e.g., the chunk) can be stored. To search for an entry in the data, the trie corresponding to the data is searched to determine the probability that the entry is in the corresponding data. Tries that show a high probability that the entry is in the corresponding data are searched further. Tries that do not show a high probability that the entry is in the corresponding data can be skipped. Searching is done using a technique similar to insertion. The entry that is being sought is normalized and the trie is searched for each substring of the entry (i.e., each substring that is the same length as the depth of the trie). There is a high probability that the entry being sought is in the data corresponding to the trie if each substring is also in the trie. Conversely, there is a low probability that the entry being sought is in the data corresponding to the trie if one or more substrings are not in the trie.

To give an example, a log entry that is being sought may be "Log Entry One." Normalizing the log entry yields "log_entry_one" where the underline character "_" represents a space (for the sake of typographical clarity). If the trie has a depth of six, substrings of the log entry are substrings of length six, which are: {"log_en," "og_ent," "g_entr," "_entry," "entry_" "ntry_o," "try_on," "ry_one"}. If the search of the trie yields results that all of these eight substrings are in the trie, then it is highly likely that "Log Entry One" is in the data corresponding to this trie. Conversely, if the search of the trie yields results that indicate that only some (or, perhaps none) of the substrings are in the trie, then it is increasingly less likely that "Log Entry One" is in the data corresponding to this trie. Additionally, a search the trie cannot have a false negative in that, if the entry is in the data corresponding to the trie, the search will not indicate that the substrings are not in the trie. As with the insertion described above, the search is linear in the size of the search string (the operations for insertion and search are functionally identical).

If the search of the trie indicates a high probability that the sought entry is in the data corresponding to the trie, then the data corresponding to the trie can be searched to determine precisely if the sought entry is in the data (e.g., the chunk may be searched) and also where in the data that the sought entry is located. In the case of a tiling trie, at the coarser levels, the data corresponding to the trie may be the finer level tries that were merged to produce the tiling trie. Such finer level tries can be searched as described above until a trie is located with a high probability that the sought for data is in the data corresponding to the trie. Such tiling tries (or trees of tries) allow for rapid searching of large amounts of data and a quick culling of the search space of the log data corpus.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where log data is indexed using tiling tries in accordance with an embodiment. In the example illustrated in FIG. 1, one or more services or resources 102 of a computing resource service provider 104 may provide log data 106 to a logging service 108. The services or resources 102 are provided by the computing resource service provider 104 for use by customers of the computing resource service provider 104 both as described below. Each of the services or resources 102 generates log event notifications related to operation of the resource or service so that, for example, errors in operation, security concerns, status updates, logging of requests from other services or resources, or other such operations are recorded.

It should be noted that, while the examples described herein refer to logging services and log data, other types of streaming data, streaming textual data, non-streaming data, and non-streaming textual data may also be processed using the techniques described herein. For example, a corpus of English text from, for example, a collection of books may be similarly indexed and searched using the techniques described herein. It should also be noted that, while the examples described herein are based on a solution to the problem of finding a data item in a collection of data, the techniques described herein may also be used to, for example, gather statistics on the textual data, analyze trends in the textual data, produce reports about the textual data, or other such operations. For example, the processes illustrated below for searching for a data item (i.e., a sought data item) may also be used to search for all occurrences of that data item in the data, thereby producing a frequency count of elements for the sought data item.

For example, a virtual computer system service may receive a request to instantiate several virtual machine instances on behalf of a customer. When the request is received, a log event notification may be generated indicating the request. Each of the instantiation events for the several virtual machine instances may also cause the generation of one or more additional log event notifications including, but not limited to, log event notifications for instantiation, startup, configuration, application startup, network connection, and connection with other resources. Additionally, other elements associated with those operations (e.g., the network, the applications, the other resources) may generate additional log event notifications. As may be contemplated, the examples of events and operations that may cause log event notifications described herein are merely illustrative examples and other such events and operations that may cause log event notifications may be considered as within the scope of the present disclosure.

The logging service 108 is a service that receives the log data 106 and/or log event notifications associated with each entry in the log data 106. The logging service 108 may receive the log data using a direct connection such as, for example, a network connection. The logging service 108 may also receive the log data by, for example, interfacing with a separate service, monitoring one or more network addresses, monitoring a storage location, or subscribing to an event notification service. In the example illustrated in FIG. 1, the logging service 108 provides the log data as a stream (referred to herein as a "log data stream") to a log data processing service 112 of the computing resource service provider 104. The log data stream 110 is a continuous stream of log data or other such textual data that is received and processed as it is received. In another embodiment, the log data stream 110 is stored in an intermediate location before being processed by the log data processing service 112. The log data processing service 112 is an example of a textual data processing, which receives any textual data and processes and/or analyzes the data using the techniques described herein.

In the example illustrated in FIG. 1, the logging service 108 also provides 114 the log data 106 for storage in a log 116, which may be one or more storage locations provided by the computing resource service provider 104. The log 116 may include the same data as the log data stream 110 or it may include a subset of the data in the log data stream. For example, the log 116 may include a filtered subset of the log data, or it may include data for a determined time period, or may include some other subset of the log data stream.

In the example illustrated in FIG. 1, the log data processing service 112 receives the log data in the log data stream 110 and processes the log data 124 before using the processed log data to generate one or more tries 126. The generated tiling tries 128 are then combined into tiling tries (also referred to herein as "trees of tries"). The tiling tries are then used to search the data for entries. Each of these steps is described in greater detail below. In the example illustrated in FIG. 1, the log data 122 from the log 116 is used by the log data processing service 112 to locate the data from the log data stream 110 that corresponds to the tiling tries 128. A tiling trie is an example of a probabilistic data structure in that, as used herein, it provides a probability indication that a particular data item is in the data indexed by the tiling trie. A tiling trie (and a trie) have an associated false positive metric (i.e., a probability that a tiling trie or a trie will indicate that a particular data item is in the data indexed by the trie when it is not) but do not have a false negative rate (i.e., tiling tries will not indicate that a particular data item is not in the data indexed by the trie when, in fact, the opposite is true).

Because tiling tries are probabilistic data structures, the indexing of the data provided by the tiling tries is a probabilistic index (i.e., the index indicates a probability that the sought data is in a location that corresponds to location referenced by the tiling trie). The log data processing service 112 may then use the probabilistic index to search 130 the log data 122 to determine whether the sought data is actually in the location that corresponds to location referenced by the tiling trie and, consequentially, where the sought data is in the location that corresponds to location referenced by the tiling trie. Further details about the correspondence between the probabilistic index of the tiling trie and the log data are described below.

Although the example illustrated in FIG. 1 illustrates the log data processing service 112 as a separate service from the logging service 108, in an embodiment, the log data processing service 112 is the same as the logging service 108 and provides the functionality associated with the logging service 108 described herein. In the example illustrated in FIG. 1, the log data received by the logging service 108 includes external log data 118 received 120 from outside of the computing resource service provide environment. The external log data 118 may be from customers of the computing resource service provider 104, from services, applications, modules, or interfaces hosted outside of the computing resource service provider 104, or from services, applications, modules, or interfaces configured to connect and/or communicate with the services or resources 102 of the computing resource service provide. In an embodiment, the external log data 118 comes from services, applications, modules, or interfaces hosted in an isolated private network (e.g., a virtual private network) hosted by the computing resource service provider 104, but logically isolated from the other services or resources 102 of the computing resource service provider 104.

Figure 2:
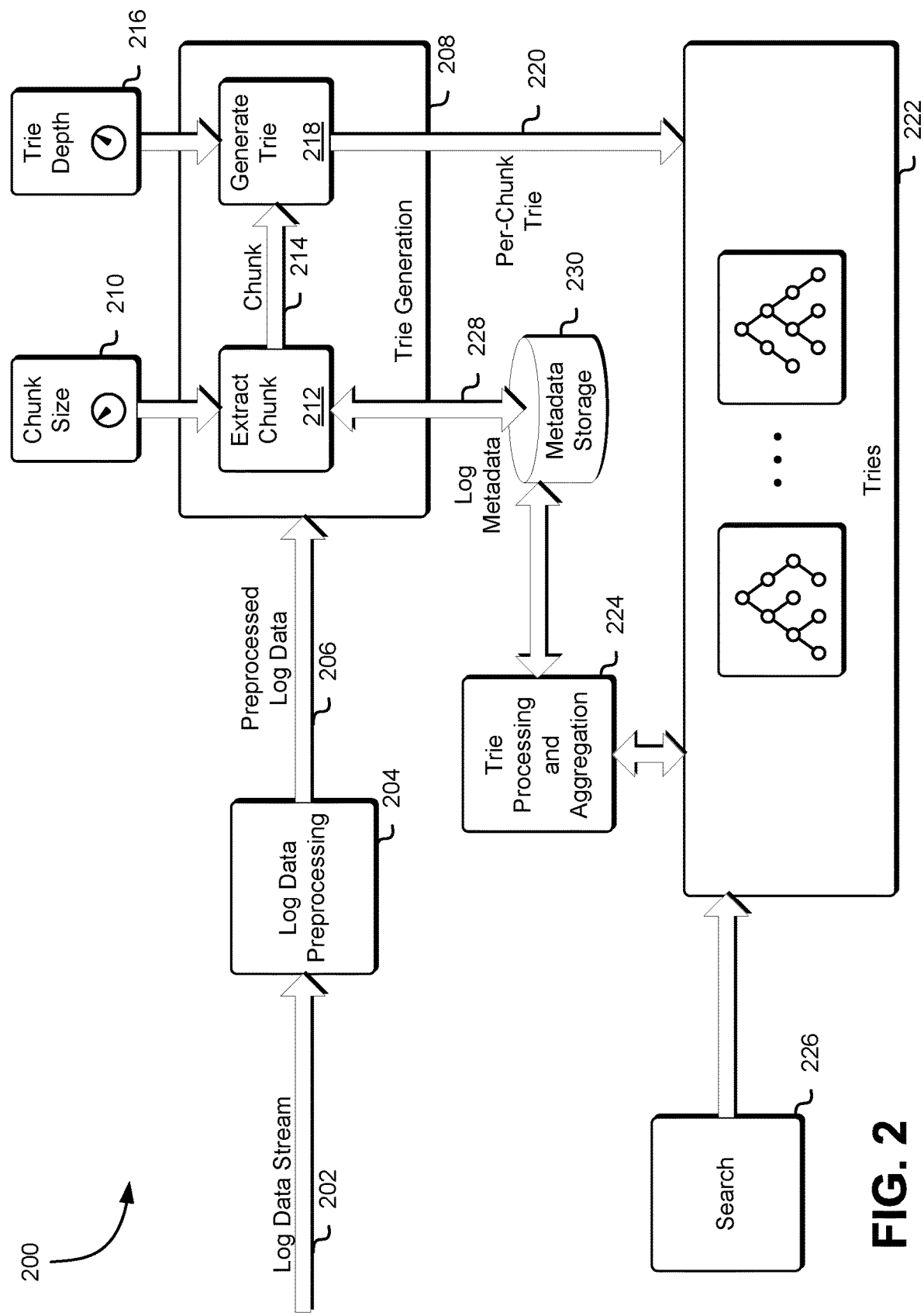
FIG. 2 illustrates an example environment where a log data processing service indexes and analyzes log data using tiling tries.

FIG. 2 illustrates an example environment 200 where a log data processing service indexes and analyzes log data using tiling tries as described in connection with FIG. 1 and in accordance with an embodiment. The log data processing service (not illustrated in FIG. 2) is the same as the log data processing service 112 illustrated in FIG. 1. First, a log data stream 202 is received and preprocessed. The log data preprocessing 204 includes, for example, removing one or more characters of a first classification (e.g., one or more characters classified as special characters including, but not limited to, line feed characters, return characters, formatting characters, punctuation characters, or white space characters) and normalizing the resulting log data stream 202 to a simplified alphabet such as, for example, twenty-six letters (for English language log entries), ten digits, and a space character. In an embodiment, the normalization includes some punctuation and/or other delimiter characters when, for example, multiple lines of text are included in a single chunk (described below).

The preprocessed log data 206 (e.g., the log data in normalized form) is then used for trie generation 208. In the example illustrated in FIG. 2, the first step in the trie generation 208 is to extract 212 a chunk 214 of the preprocessed log data 206 that is used to generate the trie. As used herein, a "chunk" of the log preprocessed log data is 206 is a subset of the preprocessed data with a size that is based at least in part on a chunk size 210. The chunk size 210 may be based on a number of characters, a number of lines, a time period, or one or more shared data characteristics.

In an embodiment, the chunk size is a single log entry which may include a widely varying number of characters. An illustrative example of the form of a log entry is "ServiceName Date Time Operation Entity Message." So, for a virtual computer system service, the log entry may look like "VCS 12/15/2017 14:25:34.105 Instantiating 010.000.000.007 Error: Failed to initialize network!" and the normalized form may be "vcs 12152017 142534105 instantiating 010000000007 error failed to initialize network" based on the normalized alphabet described above. Because the ServiceName, the Operation, the Entity, and the Message can have very different numbers of characters in each field, a chunk size that is based on a single log entry can also have a large variance in the number of characters in the chunk.

The chunk size 210 used to extract 212 the chunk 214 (also referred to herein as a "chunk size parameter") is a parameter of the trie generation 208 that can be adjusted based on the data to improve the efficiency of the trie generation 208 (i.e., the efficiency of the storage). The chunk size 210 used to extract 212 the chunk 214 is a parameter of the trie generation 208 that can also be adjusted based on the data to improve the efficiency of the search using tries as described below. For example, one chunk for each single log entry may yield a large variance in the size of the resulting tries because of, for example, the different sizes of each entry but may make searching more efficient because if the tiling trie indexing indicates a high degree of probability that the sought data is in the log entry, searching that single log entry is a relatively efficient search. Conversely, one chunk for a set number of characters may yield a more consistent trie size, but may make the underlying search (i.e., the search for the sought data) more complex. For log data, a chunk size 210 based on one or more complete log entries may be more efficient for searching. For other textual data, a chunk size 210 based on a sentence, a paragraph, or a number of characters may be more efficient for searching.

A second parameter used in trie generation 208 is the trie depth 216. The trie depth 216 is the maximum depth of the trie that is generated from the chunk 214. When the trie is generated 218, the trie depth 216 is the length of each substring of the chunk that is inserted into the trie. So for example, a trie depth 216 of six and the chunk "vcs 12152017 142534105 instantiating 010000000007 error failed to initialize network" will result in inserting all of the substrings of length six into a trie (i.e., "vcs121," "cs1215," "s12152," . . . , "network," and "etwork"). For a chunk of length "n" and a trie depth of "m," there are "n−m+1" substrings of length "m" so, for the chunk "vcs 12152017 142534105 instantiating 010000000007 error failed to initialize network" there are 84 characters (including spaces) and 79 substrings of length 6.

As with the chunk size 210, the trie depth 216 (also referred to herein as a "trie depth parameter") used to generate the trie is a parameter of the trie generation 208 that can be adjusted based on the data to improve the efficiency of the trie generation 208 (i.e., the efficiency of the storage). The trie depth 216 used to extract 212 the chunk 214 is a parameter of the trie generation 208 that can also be adjusted based on the data to improve the efficiency of the search using tries as described below. In the case of the trie depth, a smaller trie depth makes the trie shallower, which increases the redundancy of the storage, but which in turn increases the rate of false positive results.

For example, a trie depth of two for the chunk "vcs 12152017 142534105 instantiating 010000000007 error failed to initialize network" would insert the string "in" into the trie once for the three instances of the substring (two for the word "instantiating and one for the word "initialize"). However, such a shallow trie depth would yield false positive results for, for example, "inner," "interview," "internal," and so on. Conversely, a trie depth of six would insert the strings "instan," "ing_01," and "initia," giving no false positives for the examples above. Generally the depth of the trie and the corresponding metric of false positive results can be adjusted based on the data being processed. For log data, which as described above may be highly redundant, a larger trie depth may be required to reduce false positive results while for general textual data (e.g., English language data from a corpus of such data), which is redundant but less so, a smaller trie depth may be sufficient to reduce false positive results.

In the example illustrated in FIG. 2, the trie generation 208 produces a per-chunk trie 220 based on the chunk size 210 and the trie depth 216. The per-chunk trie 220 is then stored with other tries 222. In an embodiment, the per-chunk trie 220 is stored with the chunk 214 used to generate the per-chunk trie 220. In another embodiment, the per-chunk trie 220 is stored separately from the chunk 214 used to generate the per-chunk trie 220 and a correlation between the per-chunk trie 220 and the chunk 214 used to generate the per-chunk trie 220 is stored in, for example, a separate database.

As tries 222 are produced, the log data processing service may perform one or more trie processing and aggregation 224 operations to, for example, merge tries into tiling tries (or trees of tries), update the correlation between the trie and the chunk used to generate the trie (when correlations are used), or store tiling tries with the aggregate of the data. Although not illustrated in FIG. 2, the trie processing and aggregation 224 operations may be based on additional parameters. For example, the trie processing and aggregation 224 may perform such aggregation on a set number of tries (i.e., three tries, and thus three chunks, may be merged together) or on a time window (i.e., all chunks from the past ten minutes may be merged together). In an embodiment, the tries that are merged are retained to help facilitate the search 226 for the sought data in the tries. Retaining the tries that are merged helps facilitate the search for the sought data in the tries because if a tiling trie shows a strong probability that the sought data is in the data indexed by the tiling trie, then the tries used to generate the tiling trie can be searched to refine that possibility. In another embodiment, the tries that are merged are discarded below a certain level because it may be more efficient to search 226 for the sought data directly rather than search the tries that are merged. For example, it may be more efficient to search 226 for the sought data directly when an amount of storage required to store the trie exceeds some percentage of the amount of storage required to store the data. That is, when the amount of storage for the trie means that the trie is an inefficient storage mechanism for the data. As with the parameter for how the tries are merged, the parameter for whether to discard or retain tries and/or at what depth of the tiling trie to do the discarding may be based on the data received.

Coarser levels of tries may be merged together (i.e., lower-level tries may be merged into higher-level tries) until the false positive metric (i.e., the rate at which false positive results occur) of the trie makes further merging useless. Thus, an entire corpus of data may have multiple "highest-level" tiling tries. In the example of tiling tries for log data such as those described herein, each highest-level tiling trie may represent a number of log entries (i.e., a number of chunks), a minute of log data, an hour of log data, etc.). In the example of tiling tries for other textual data, each highest-level tiling trie may represent a paragraph, or a page of data, or some other logical and/or physical data subdivision.

The log data processing service may perform further operations on the log data, the chunk, or the tries to aid in the trie processing and aggregation 224 and the search 226. In the example illustrated in FIG. 2, the log data processing service extracts log metadata 228 and stores it in metadata storage 230. The log metadata 228 in the metadata storage 230 may include one or more correlations between the chunk and the trie including, but not limited to, character and/or substring frequency counts (i.e., frequency count of elements in the substring), initial and trailing sub strings that are less than the sub string length, or the type of data. Such log metadata may be used by the trie processing and aggregation 224 or the search 226 to improve the efficiency of the associated operations.

Figure 3:
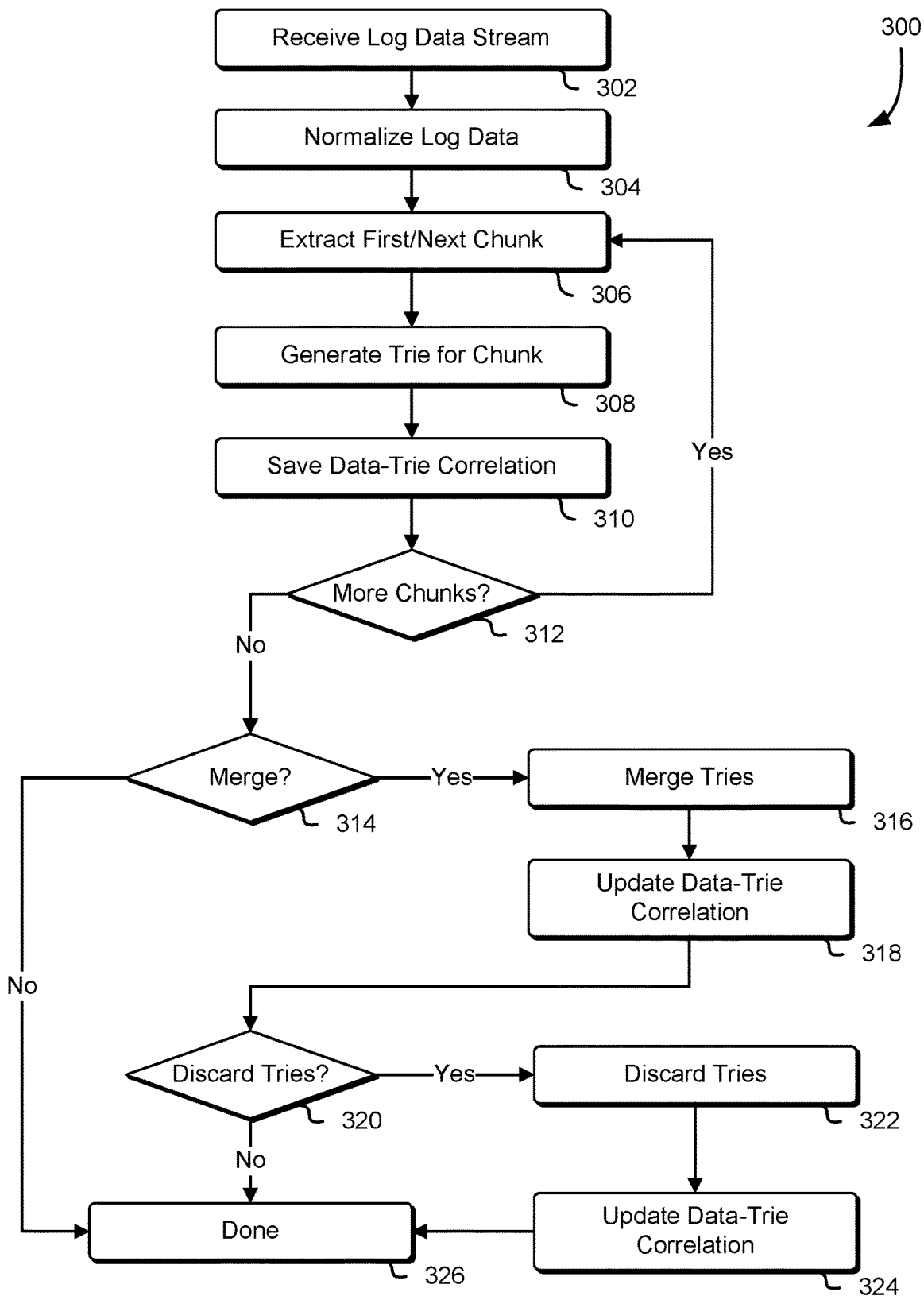
FIG. 3 illustrates an example process for indexing and analyzing log data using tiling tries.

FIG. 3 illustrates an example process 300 for indexing and analyzing log data using tiling tries as described in connection with FIG. 1 and in accordance with an embodiment. A log data processing service such as the log data processing service 112 described in connection with FIG. 1 may perform the example process 300 illustrated in FIG. 3. First, the log data processing service receives 302 the log data stream and normalizes 304 the log data by, for example, removing punctuation and one or more characters classified as special characters (e.g., line feed characters, tab characters, return characters, formatting characters, etc.), changing all of the characters to the same case, and other operations to improve the data storage.

It should be noted that actions attributed to the log data processing service described herein such as, for example the above statement that "the log data processing service receives 302 the log data stream" may be understood to mean that the log data processing service performs one or more operations and/or executes one or more executable instructions to cause the action to be performed.

Next, the log data processing service extracts 306 a chunk from the data, generates 308 a trie for the chunk, and, in an embodiment, saves 310 a correlation between the trie and the chunk used to generate the trie so that, for example, the underlying data may be located from the trie. It should be noted that, although FIG. 3 illustrates normalizing the log data before extracting the chunk, the log data may also be normalized after extracting the chunk.

The log data processing service may continue extracting chunks, generating tries, and saving the correlations until there are no more chunks 312. At that point, the log data processing service determines 314 whether to merge the tries for the chunks into tiling tries (or trees of tries) as described herein. If the log data processing service determines 314 to merge the tries for the chunks into tiling tries, the log data processing service merges 316 the tries into tiling tries and then updates 318 one or more of the correlations between the tiling tries and the tries that are merged.

The log data processing service will next determine 320 whether to discard the tries that were generated by the chunks after the merge and/or tiling tries generated from those tries. The log data processing service may discard the tries below a determined level or based at least in part on the efficiency of, for example, the compression associated with the trie or the tiling trie. If the log data processing service does determine 320 to discard tries 322, the log data processing service updates 324 one or more correlations between a tiling trie and the underlying data and/or between a tiling trie and one or more sub-tries (i.e., tries at a lower level in the hierarchy). After the example process 300 illustrated in FIG. 3 is done 326, the process may begin again when new log data from the log data stream is received. In an embodiment, a number of instances of the example process 300 illustrated in FIG. 3 may be performed by the log data processing service in parallel so that, for example, multiple log data streams may be performed simultaneously by the log data processing service.

Figure 4:
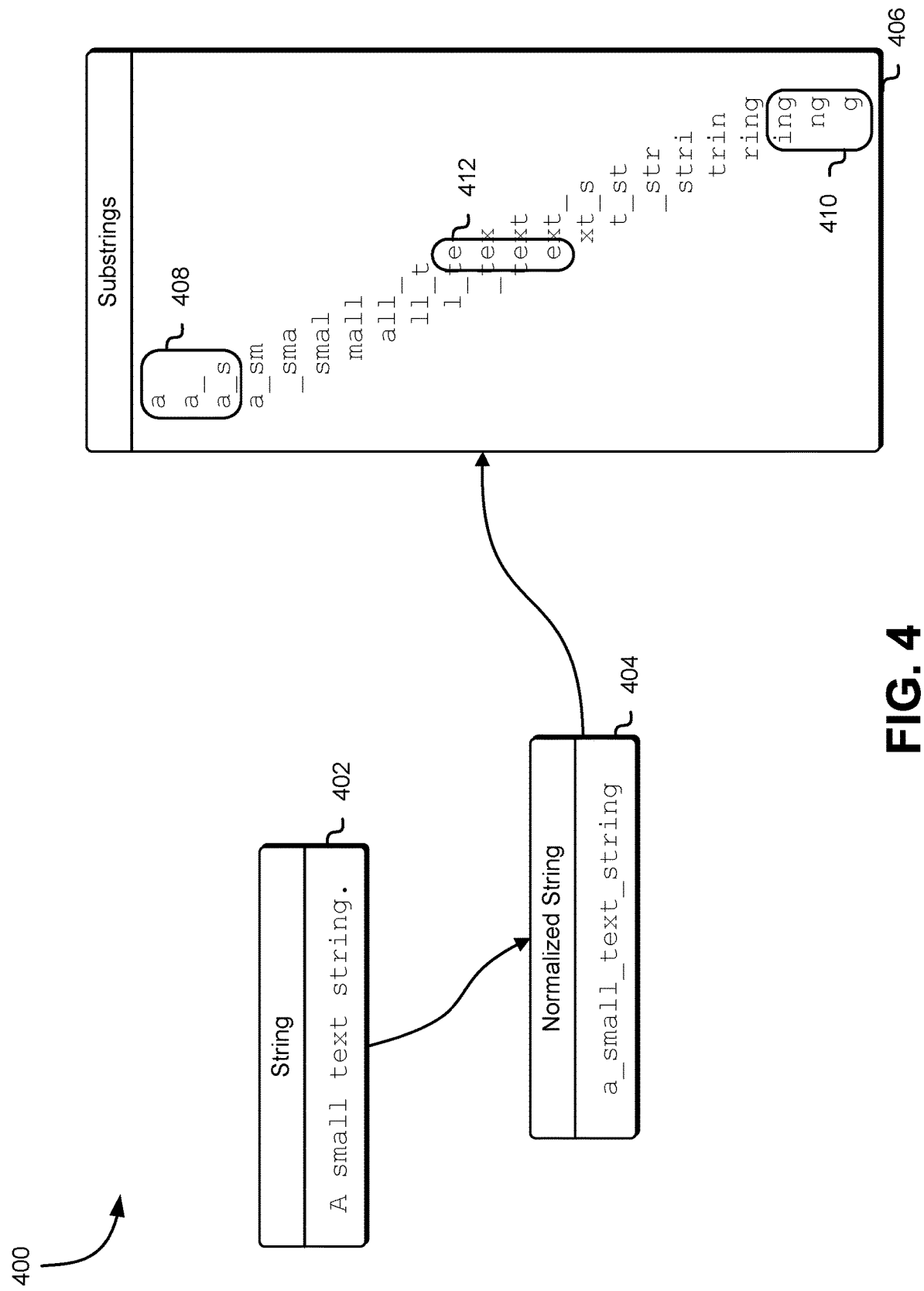
FIG. 4 illustrates an example diagram of substrings extracted from a normalized string, which may be used to index and analyze log data.

FIG. 4 illustrates an example diagram 400 of substrings extracted from a normalized string, which may be used to index and analyze log data as described in connection with FIG. 1 and in accordance with an embodiment. In the example illustrated in FIG. 4, a string 402 contains "A small text string." Normalizing that string by, for example, removing all punctuation and converting all characters to lower case produces the normalized string 404 "a_small_ text_string." In an embodiment, the normalization has a case parameter (e.g., like the chunk parameter and/or the trie depth parameter described above) indicating whether the string should be normalized using all upper case, all lower case, or some other case. In such an embodiment, a search string (i.e., the sought data) is normalized using the same case parameter. It should be noted that, purely for typographical clarity, the spaces in normalized strings such as the normalized string 404 have been replaced with an underline character "_." This replacement makes it easier to read substrings that begin with, end with, or include spaces and is not intended to imply any required re-encoding of spaces in a normalized string.

In the example illustrated in FIG. 4, all of the possible substrings 406 of length less than four of the normalized string 404 are shown. All of the possible substrings 406 includes the strings of length 1, 2, and 3 at the beginning 408 of the normalized string 404 as well as the strings of length 1, 2, and 3 at the end 410 of the normalized string 404. These shorter substrings (i.e., substrings that are less than the trie depth) are not typically included in the trie generation because, as will become apparent from the discussion below, the prefix-encoded nature of the trie allows shorter substrings to be searched without storing them in the trie separately. The example illustrated in FIG. 4 shows that each of the characters in the normalized string 404 is included in exactly four substrings 412 (for a trie depth and substring length of four).

Figure 5:
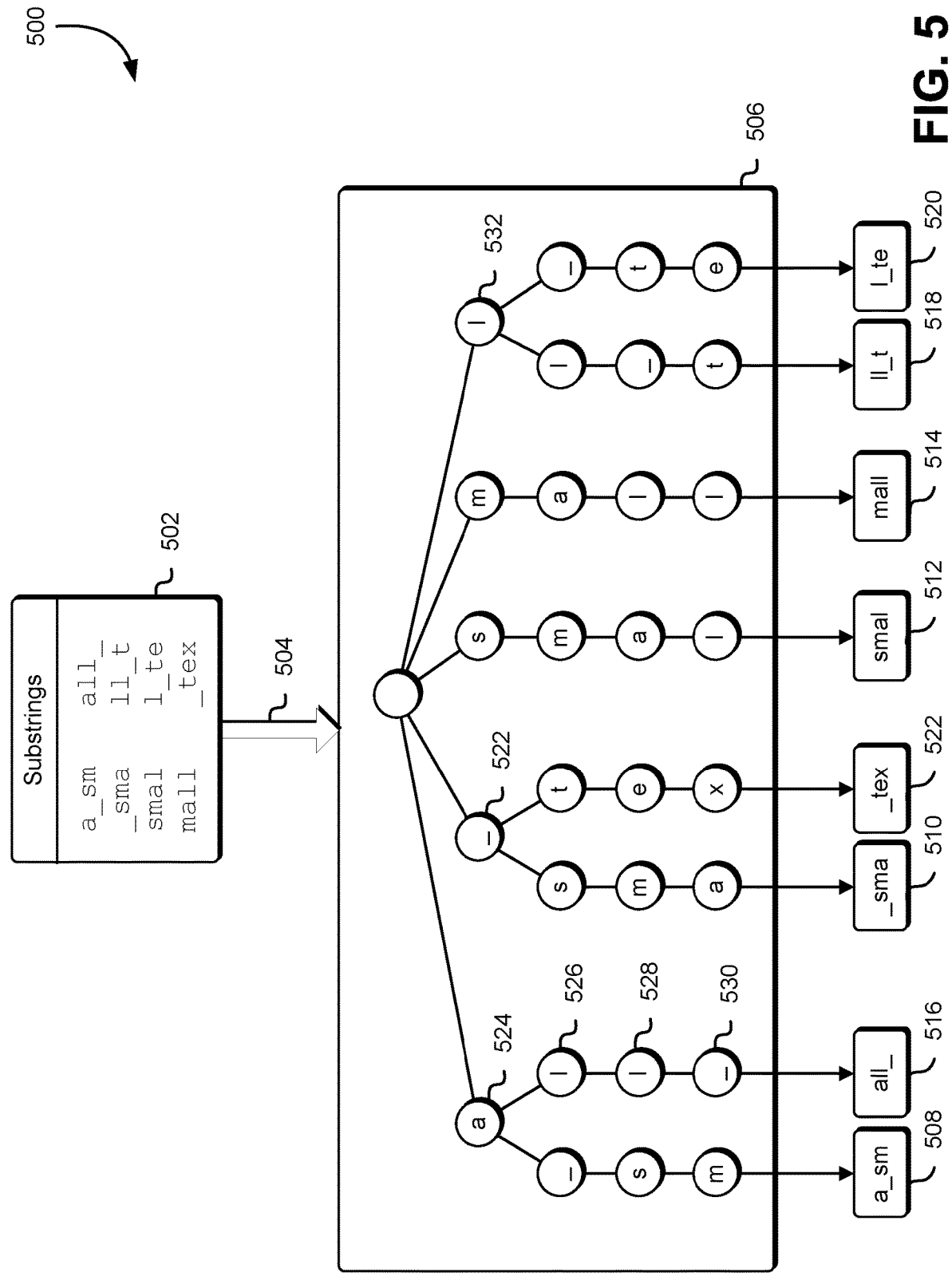
FIG. 5 illustrates an example diagram showing the first part of the insertion of substrings into a trie.

FIG. 5 illustrates an example diagram 500 showing the first part of the insertion of substrings into a trie 506 as described in connection with FIG. 1 and in accordance with an embodiment. The example illustrated in FIG. 5 shows the insertion 504 of the first eight substrings of the normalized string 404 described in connection with FIG. 4. The first eight substrings 502 may be inserted in the trie 506 in any order. First, the substring "a_sm" 508 is inserted by inserting the "a," then the "_" below the "a," then the "s" below the "_" and then the "m" below the "s." Next the substring "_sma" 510 is inserted the same way. The substring "_sma" 510 has a new first node for the "_" character (node 522) because the prefix indexing property of a trie selects child nodes based on initial characters. Similarly, because they start with an "s" and an "m" respectively, the substring "small" 512 and the substring "mall" 514 are simple insertions like the insertion for the substring "a_sm" 508 and the substring "_sma" 510.

The substring "all_" 516 shows how the trie uses prefix indexing to store data items (in this case, substrings). Since the substring "all_" 516 starts with the same character as the substring "a_sm" 508, the substring "all_" 516 is stored below the node 524 representing the "a" of the substring "a_sm" 508. For the substring "all_" 516, the characters for the first "l," the second "l," and the "_" are stored below the node 524. The trie 506 thus stores the substring "a_sm" 508 starting at the node 524 and following the left child branch and the substring "all_" 516 starting at the node 524 and following the right child branch (in this case, node 526, node 528, and node 530). In a similar manner, the substring "ll_t" 518 is first inserted starting at node 532 and the substring "l_te" 520 is also inserted starting at node 532. The last substring "_tex" 522 is similarly inserted below node 522, shared with substring "_sma" 510.

Figure 6:
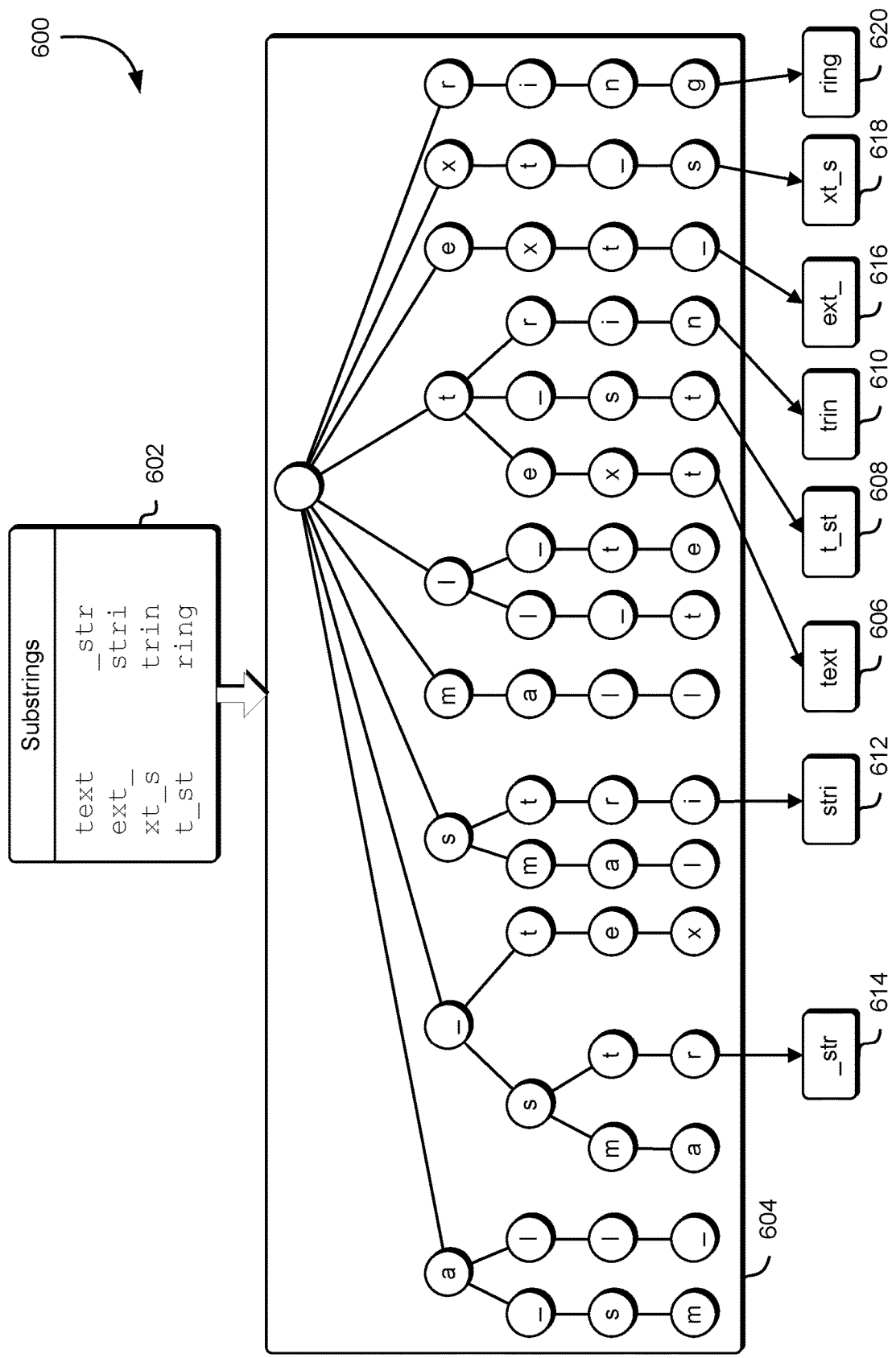
FIG. 6 illustrates an example diagram showing the second part of the insertion of substrings into a trie.

FIG. 6 illustrates an example diagram 600 showing the second part of the insertion of substrings into a trie as described in connection with FIG. 1 and in accordance with an embodiment. The example illustrated in FIG. 6 shows the insertion of the second eight substrings of the normalized string 404 described in connection with FIG. 4. The second eight substrings 602 may also be inserted in the trie 604 in any order. The insertion of the second eight substrings 602 into the trie 604 shows the increasingly compact representation of the indexing of the normalized string using a trie as more substrings are added. For example, while the substring "text" 606 starts with a new first character and is inserted as four nodes, the insertion of the substring "t_st" 608 and the substring "trin" 610 share that same first node. Similarly, the insertion of the substring "stri" 612 only adds three new nodes and the insertion of the substring "_str" 614 only adds two new nodes and while the insertion of the substring "ext_" 616, the substring "xt_s" 618, and the substring "ring" 620 each add four new nodes, these nodes may be reused when the trie is merged with other tries as described below.

Figure 7:
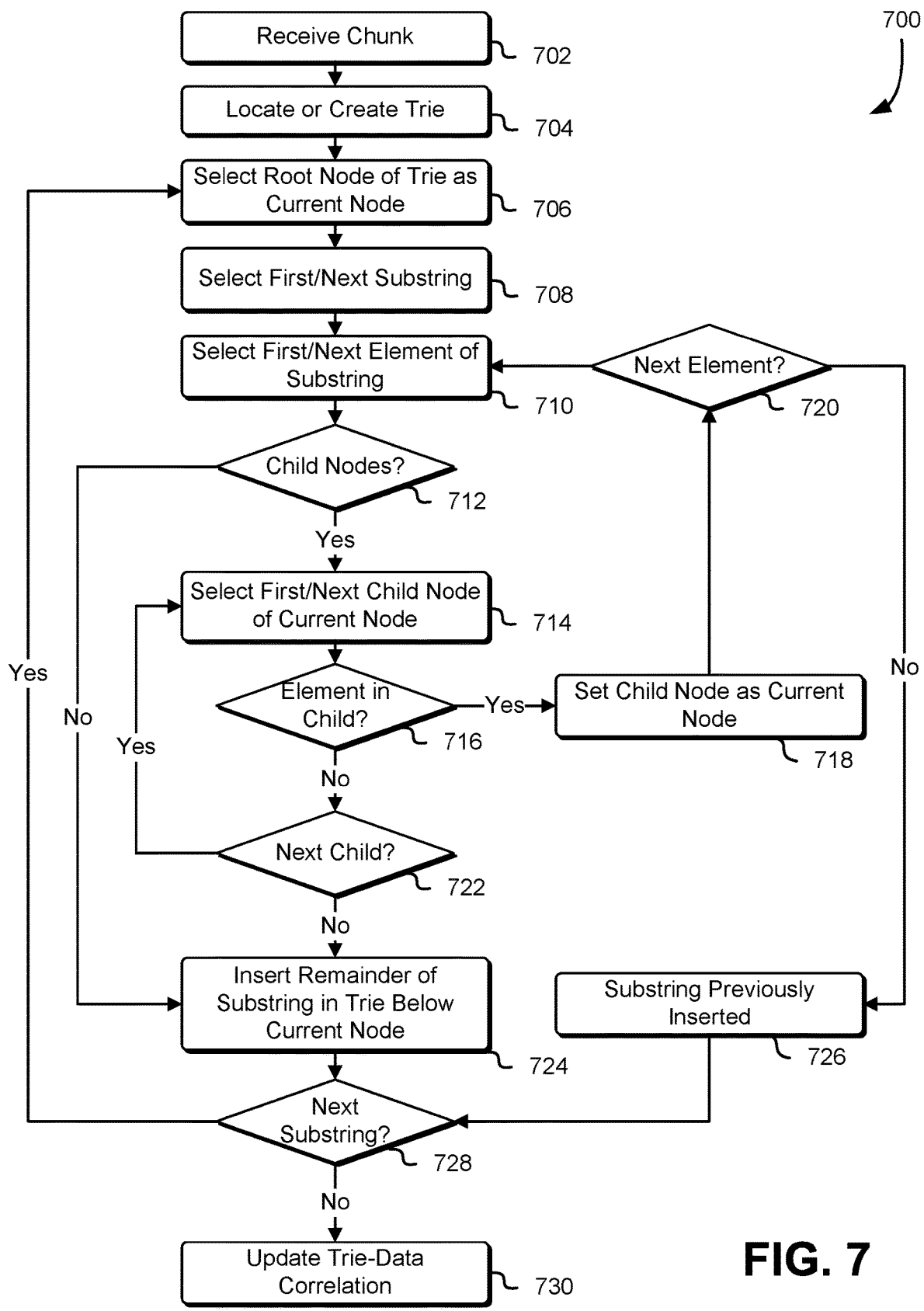
FIG. 7 illustrates an example process for indexing log data entries by inserting log data into a trie.

FIG. 7 illustrates an example process 700 for indexing log data entries by inserting log data into a trie as described in connection with FIG. 1 and in accordance with an embodiment. A log data processing service such as the log data processing service 112 described in connection with FIG. 1 may perform the example process 700 illustrated in FIG. 7. The log data processing service first receives 702 a chunk of data as described above and then locates or creates 704 a trie for that chunk. As described above, each new chunk may be placed in a separate trie to aid in underlying search efficiency and thus, each received chunk may have a newly created trie. In such an example, the log data processing service may create a new trie for each chunk. However, multiple chunks may also inserted into tries when, for example, two tries are merged due to the property that a merge of trie may be performed by inserting the elements of one trie into another trie. In such an example, the log data processing service may locate the first trie that is being merged and perform the example process 700 illustrated in FIG. 7 by inserting each of the elements from the second trie into the first trie.

For the located or created trie, the log data processing service then selects 706 the root node of that trie as the current node. In the example where the trie is newly created, the root node will be the only node in the trie. An "empty" trie has a root node with no children. In the example where the trie has previously inserted data (i.e., when a merge is being performed), the root node will be the top node of the trie. The log data processing service next begins inserting the data by selecting 708 the first substring of the chunk of data that is being inserted into the trie. The size of the substrings of the chunk will correspond to the depth of the trie as described above. The log data processing service next selects 710 the first element of that substring. For example, if the substring is "abcd1234," the first element will be the first character (i.e., the "a").

Next, the log data processing service determines 712 whether there are any child nodes of the current node (i.e., the root node). If the log data processing service determines 712 that there are child nodes of the current node, the log data processing service may begin searching for a location to insert the substring by selecting 714 the first/next child node. The log data processing service will check each of the child nodes until it determines 716 that the element of the substring is stored in the child node or that there are no more child nodes of the current node. If the log data processing service determines 716 that the element of the substring is stored in the child node, the log data processing service next sets 718 the node that contains the element as the current and determines 720 if there are more elements in the substring to insert. If the log data processing service determines 720 that there are more elements in the substring to insert, the log data processing service continues the process and selects 710 the next element of the substring as the current element and continue the process. If it is not the case that the log data processing service determines 720 that there are more elements in the substring to insert, then the substring was previously inserted 726 into the trie and a new insertion is not required because a trie does not store redundant data items.

After determining that the substring was previously inserted 726 into the trie, the log data processing service determines 728 whether there are more substrings to insert into the trie and, if so, may select 706 the root node of the trie as the current node and process the next substring. Conversely, if it is not the case that the log data processing service determines 728 that there are more substrings to insert into the trie, the log data processing service updates 730 the data correlation between the trie and the data in the chunk.

If the log data processing service determines 716 that the element of the substring is not stored in the child node, the log data processing service next determines 722 whether there are more child nodes of the current node to search. If the log data processing service determines 722 that there are more child nodes of the current node to search, the log data processing service next selects 714 the next child node and repeat the search for the insertion point. If it is not the case that the log data processing service determines 722 that there are more child nodes of the current node to search, then the insertion point has been found and the log data processing service inserts 724 the remainder of the string (i.e., the elements that have not previously been found) into the trie below the current node.

As described above, after inserting remainder of the string into the trie below the current node, the log data processing service determines 728 whether there are more substrings to insert into the trie and, if so, selects 706 the root node of the trie as the current node and processes the next substring. Conversely, if it is not the case that the log data processing service determines 728 that there are more substrings to insert into the trie, the log data processing service next updates 730 the data correlation between the trie and the data in the chunk.

Figure 8:
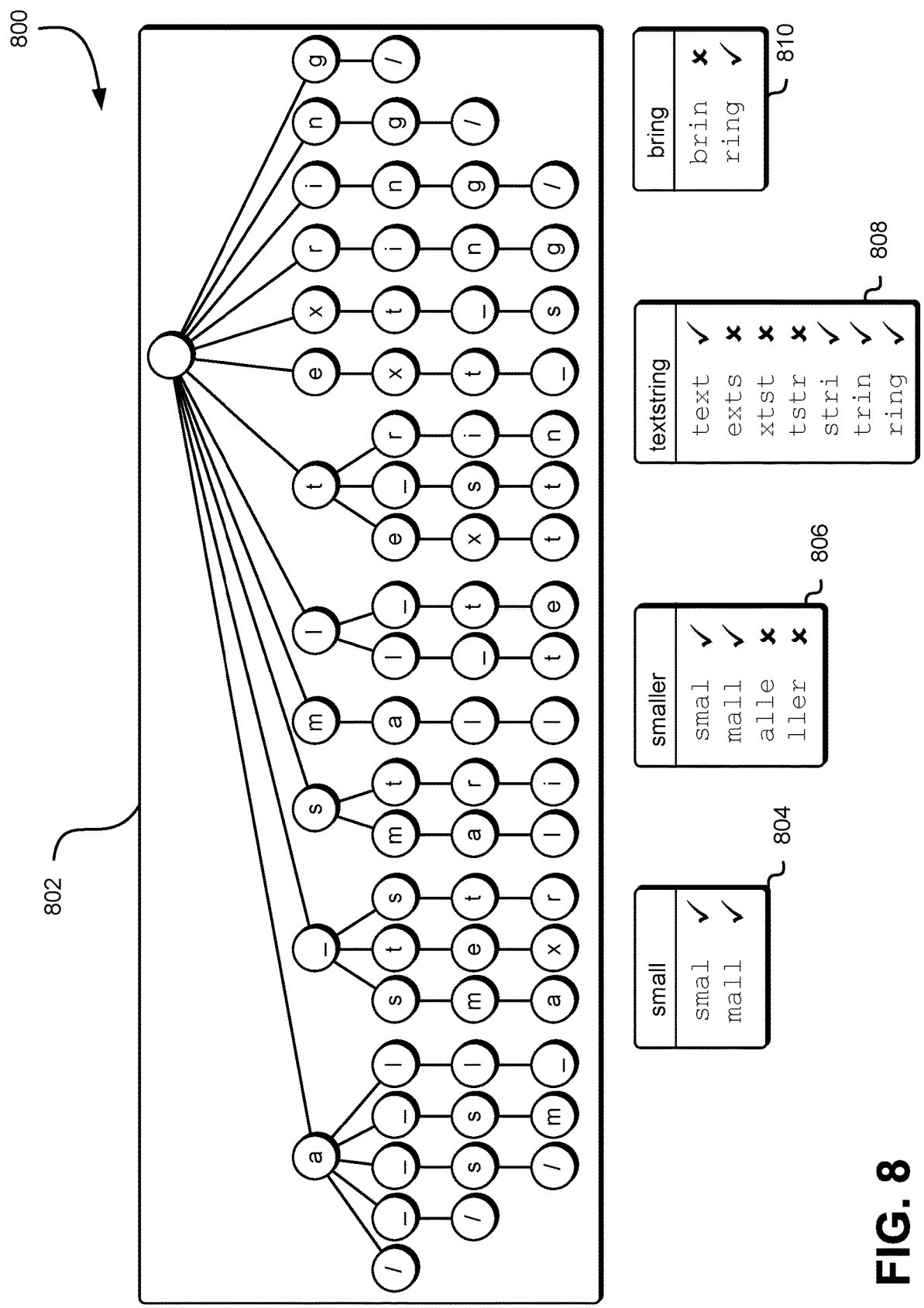
FIG. 8 illustrates an example diagram showing the probabilistic results of textual data indexed by a trie.

FIG. 8 illustrates an example diagram 800 showing the probabilistic results of textual data indexed by a trie as described in connection with FIG. 1 and in accordance with an embodiment. In the example illustrated in FIG. 8, a trie 802 is used to determine the likelihood that a string is in the textual data represented by the tiling trie. In an embodiment, the lower bound on the likelihood (also referred to herein as a "likelihood threshold") is the lowest probability that is acceptable for a successful search result. For example, a probability lower than 50% may be an indication that the string is not likely to be in the data. In an embodiment, any result with a probability greater than 0% (i.e., a likelihood threshold of 0%) is included as a found result for the sought data. In another embodiment, any result with a probability less than 100% (i.e., a likelihood threshold of 99.99%) is not included as a found result for the sought data. A likelihood threshold between these two values may also be used. The trie 802 is the trie generated from the normalized string 404 described in connection with FIG. 4 (i.e., "a_small_text_string) as described in connection with FIGS. 5 and 6. Because a tiling trie (or tree of tries) may return false positive results, but does not return false negative results (i.e., an indication that a search string is not in the data indexed by the trie when it actually is), any result with a probability less than 100% (i.e., a likelihood threshold of 99.99%) is typically taken as an indication that the search string is not in the data indexed by the trie.

In the first example illustrated in FIG. 8, the sought data is "small" with substrings "smal" and "mall" 804. Since both substrings are in the trie 802 (as indicated by the two check marks), there is a 100% probability that the sought data "small" is in the data corresponding to the trie 802. Conversely, the sought data "smaller" with substrings "smal," "mall," "alle," and "ller" 806 has two substrings in the trie 802 (again, "smal" and "mall") and two substrings that are not in the trie ("alle" and "ller"). This indicates a 50% probability that the sought data "smaller" is in the data corresponding to the trie 802 and, in the example illustrated in FIG. 8, is an indication that the string "smaller" is not in the data indexed by the trie 802.

This 50% probability for the string "smaller" is an example of a false positive since the sought data is not actually in the data corresponding to the trie, but, in an embodiment, the 50% probability may be sufficient to trigger a further search if the search threshold is set sufficiently low based on, for example, certain types of data. It should be noted that a larger trie depth (e.g., five) would reduce the likelihood of a false positive because while the substring "small" (substring of length five) would be found in the trie, the substrings "malle" and "aller" would not be found in the trie of depth five for the data "a_small_text_string," thus reducing the probability to approximately 33%. It should also be noted that the example probabilities described herein are merely illustrative examples. For example, the probability may be only based in part on the number of substrings that are in the trie and may be further based on a modification of that percentage such as, for example, based on a weighting of those percentages that may in turn be based on, for example, a frequency of the substring within the corpus so that more common substrings are weighted less when the probability that the sought data is in the data represented by the trie is evaluated.

Both the sought data "textstring" 808 and the sought data "bring" 810 show additional examples of types of false positive results. In the example of the sought data "textstring" 808, both "text" and "string" are in the data represented by the trie 802, but the compound word "textstring" is not. Similarly, the sought data "bring" 810 shows a potential false positive for a string that is very close to the depth of the trie and that contains a common root (e.g., "ring"). Both probabilities, in the example illustrated in FIG. 8, would be an indication that the sought data "textstring" 808 and the sought data "bring" 810 are not in the data indexed by the trie 802. In the examples illustrated in FIG. 8, the log data processing service can terminate processing as soon as the first indication that a substring is not found. So, for example, the log data processing service can stop searching after the not found indicator from the substring "alle" in the string "smaller," or after the not found indicator from the substring "exts" of the string "textstring," or after the not found indicator from the substring "brin" of the string "bring."

A service such as the log data processing service described herein may, as a result of determining the probabilistic results of textual data indexed by a trie, report information that probabilistically indicates that a log entry is in a set of log data (i.e., the set of log data indexed by the trie), the information generated based at least in part on the aggregated probabilities described above. In an embodiment where the service such as the log data processing service described herein is processing textual data, the service instead reports information that probabilistically indicates that the data item (e.g., the sought data) is in a set of textual data (e.g., the set of textual data indexed by the trie), the information also generated based at least in part on the aggregated probabilities described above.

Figure 9:
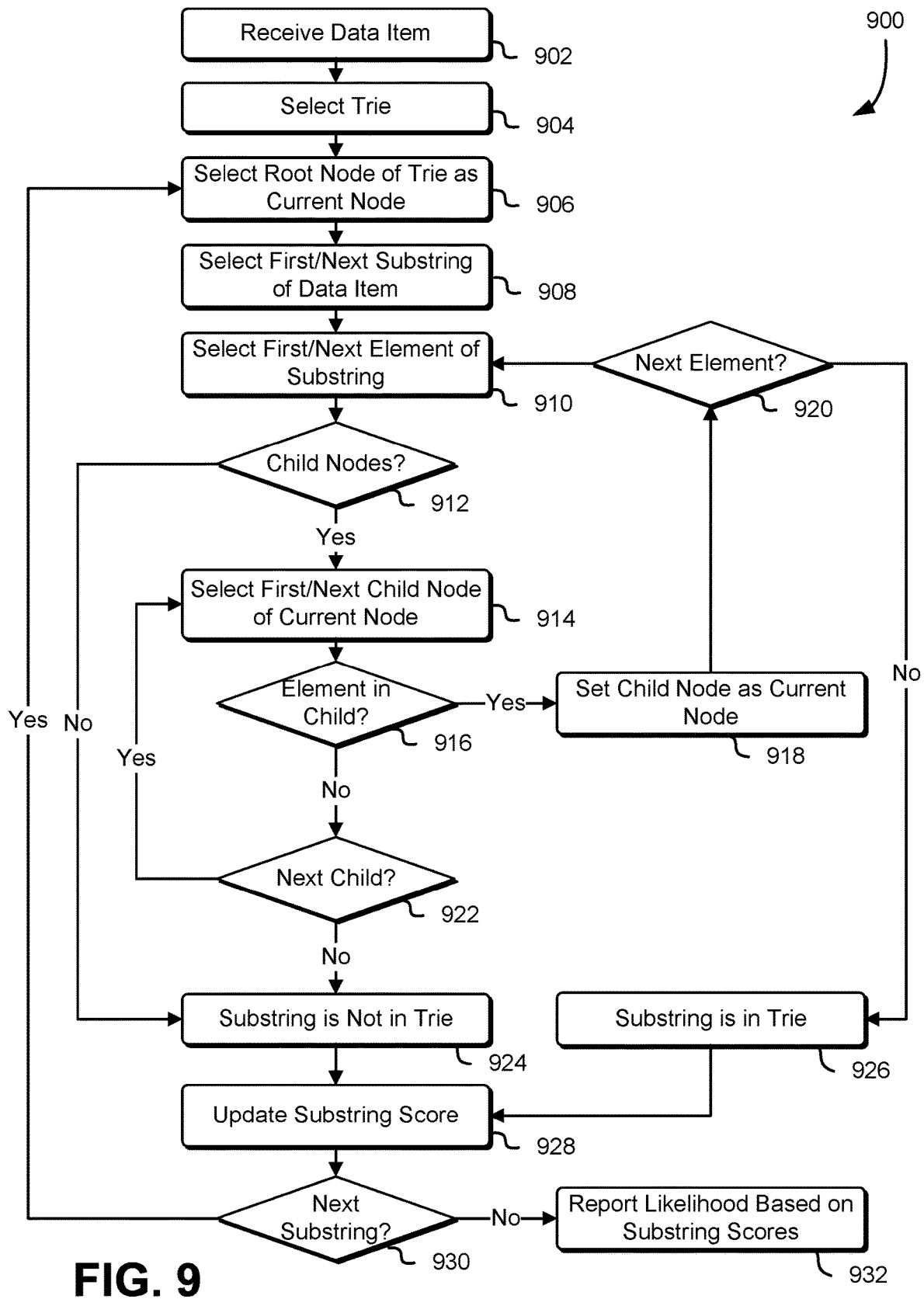
FIG. 9 illustrates an example process for searching for log entries within log data indexed by a trie.

FIG. 9 illustrates an example process 900 for searching for log entries in a trie as described in connection with FIG. 1 and in accordance with an embodiment. A log data processing service such as the log data processing service 112 described in connection with FIG. 1 may perform the example process 900 illustrated in FIG. 9. The log data processing service first receives 902 a data item to search for (i.e., the sought data) and begins the search by selecting 904 a tiling trie that may contain the sought data. To begin the search, the log data processing service selects 906 the root node of the selected trie as the current node. The log data processing service then selects 908 the first substring of the sought data and selects 910 the first element (i.e., the first character) of that substring. The log data processing service next determines 912 whether there are any child nodes of the current node to search and, if any are found, selects 914 child nodes of the current node.

If the log data processing service determines 916 that the element of the substring is in the selected child node, the log data processing service next sets 918 the child node that contains the element as the current node and determines 920 if there are more elements in the substring of the sought data (i.e., the data that is being searched for). If the log data processing service does determine 920 that there are more elements in the substring to search for, the log data processing service selects 910 the next element of the substring as the current element and continues the process. If it is not the case that the log data processing service determines 920 that there are more elements in the substring, then the substring is in the trie 926 (i.e., the substring has been found).

After determining that the substring is in the trie 926, the log data processing service next updates 928 a score for that substring. For example, a sought data item may have ten substrings that have a length that is the same as the depth of the trie. Initially, it is not known whether any of these substrings are in the trie and thus the score for each of the substrings may be zero. As substrings are found in the trie, the score for each substring may be changed to one. In an embodiment, updating the substring score may include updating a probability that the sought data is in the data indexed by the trie based on found substrings. As before, the probability may initially be zero and, as substrings of the sought data are found in the trie, the probability that sought data is in the data indexed by the trie may be increased. So, for example, knowing that there are ten substrings, then for each substring found, the probability may be increased by 10%. In another example, the probability that the sought data is in the string may be based on the substrings searched so far. So if the first substring is found, the probability may be 100% (i.e., one out of one) and as subsequent substrings are found or not found, the probability may be adjusted accordingly.

Next, the log data processing service determines 930 whether there are more substrings of the sought data to search for. If the log data processing service determines 930 that there are more substrings of the sought data to search for, the log data processing service selects 906 the root node of the trie as the current node and processes the next substring. Conversely, if it is not the case that the log data processing service determines 930 that there are more substrings of the sought data to search for, the log data processing service reports 932 the likelihood that the sought data is in the trie based on the substring scores or based on the probability calculation.

As described above, the likelihood that the sought data is in the trie based on the substring scores or based on the probability calculation that the log data processing service reports 932 may be a probability (e.g., a score from zero to one or a percentage). In an embodiment, the likelihood that the sought data is in the trie based on the substring scores or based on the probability calculation that the log data processing service reports 932 is an indicator of "yes" or "no" (e.g., a flag, a Boolean value, of a text string) that is based on the substring scores or based on the probability calculation as described above. Considering the examples illustrated in FIG. 8, the sought data "small" would cause the log data processing service to report "yes," indicating that the sought data "small" may be in the data indexed by the trie while the sought data "smaller," the sought data "textstring," and the sought data "bring" would cause the log data processing service to report "no," indicating that those examples are definitely not in the data indexed by the trie.

If the log data processing service determines 916 that the element of the substring is not stored in the child node, the log data processing service determines 922 whether there are more child nodes of the current node to search. If the log data processing service determines 922 that there are more child nodes of the current node to search, the log data processing service selects 914 the next child node and repeat the search for the sought data. If it is not the case that the log data processing service determines 922 that there are more child nodes of the current node to search, then the substring is not in the trie 924. In an embodiment, the log data processing service terminates the search and returns a "not found" indicator after the first indication that an element of the substring is not in the trie, as described above.

As described above, after determining that the substring is not in the trie, the log data processing service next updates 928 a score for that substring and determines 930 whether there are more substrings of the sought data to search for. If the log data processing service determines 930 that there are more substrings of the sought data to search for, the log data processing service selects 906 the root node of the trie as the current node and processes the next substring. Conversely, if it is not the case that the log data processing service determines 930 that there are more substrings of the sought data to search for, the log data processing service reports 932 the likelihood that the sought data is in the trie based on the substring scores or based on the probability calculation.

It should be noted that the example process 700 for indexing log data entries by inserting log data into a trie illustrated in FIG. 7 and the example process 900 for searching for log entries in a trie illustrated in FIG. 9 have a number of similarities. A trie insertion can be thought of as the same process as a search where, once the location is found (or not found), the remaining data is inserted at the point of the search. Conversely, a trie search can be performed by attempting an insertion and, if the insertion does not alter the trie (i.e., does not insert any new nodes) then the sought data is in the trie.

Figure 10:
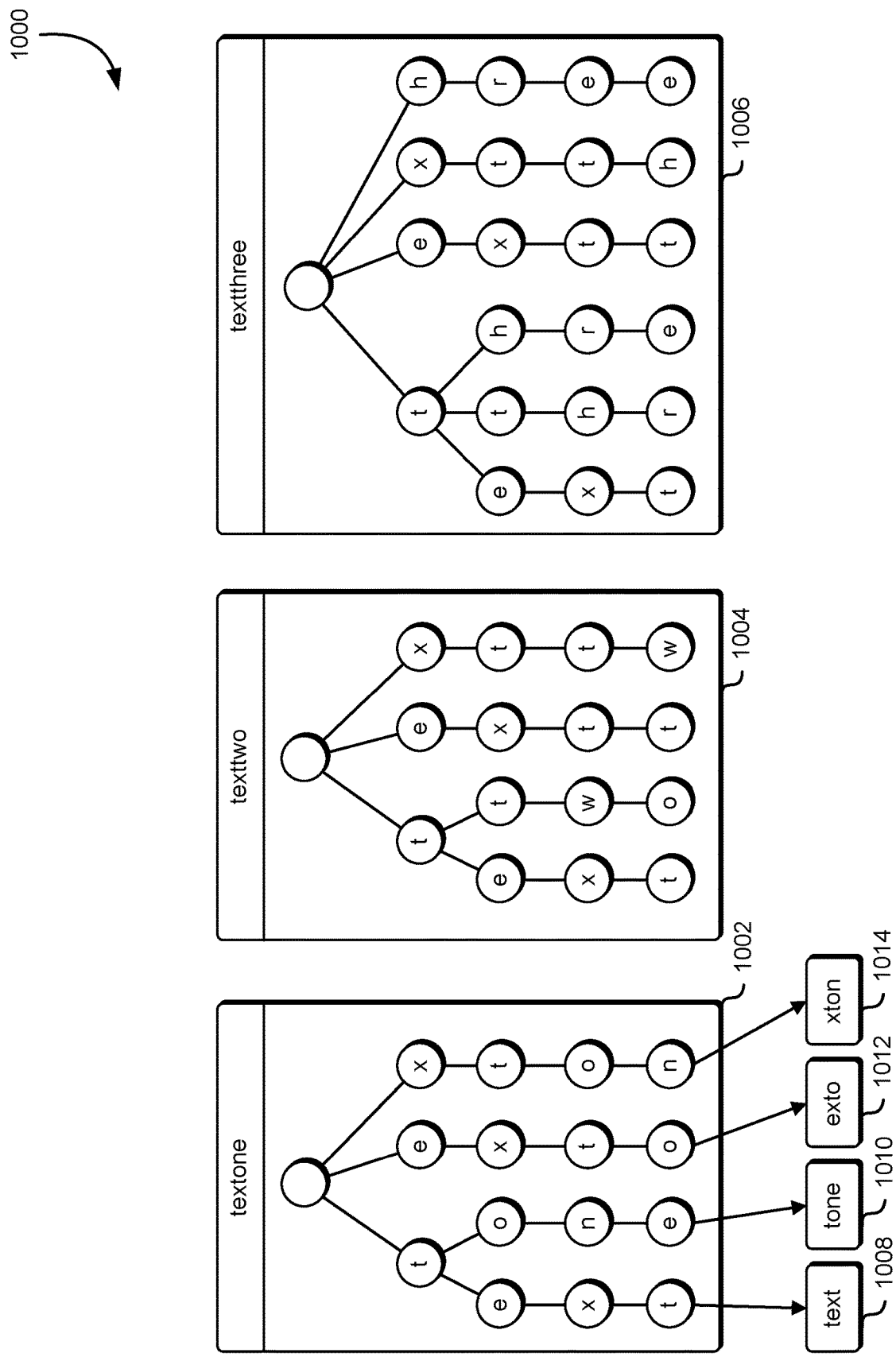
FIG. 10 illustrates an example diagram showing how textual data may be represented by tries.

FIG. 10 illustrates an example diagram 1000 showing how textual data may be represented by tries as described in connection with FIG. 1 and in accordance with an embodiment. In the example illustrated in FIG. 10, the substrings "text" 1008, "tone" 1010, "exto" 1012, and "xton" 1014 have been inserted into a trie indexing the data "textone" 1002. A trie indexing the data "texttwo" 1004 and a trie indexing the data "textthree" 1006 have been similarly generated by inserting the substrings of "texttwo" and "textthree" respectively. The trie indexing the data "textone" 1002, the trie indexing the data "texttwo" 1004, and the trie indexing the data "textthree" 1006 are each of depth four. The trie indexing the data "textone" 1002, the trie indexing the data "texttwo" 1004, and the trie indexing the data "textthree" 1006 are used in the descriptions of FIGS. 11-13.

Figure 11:
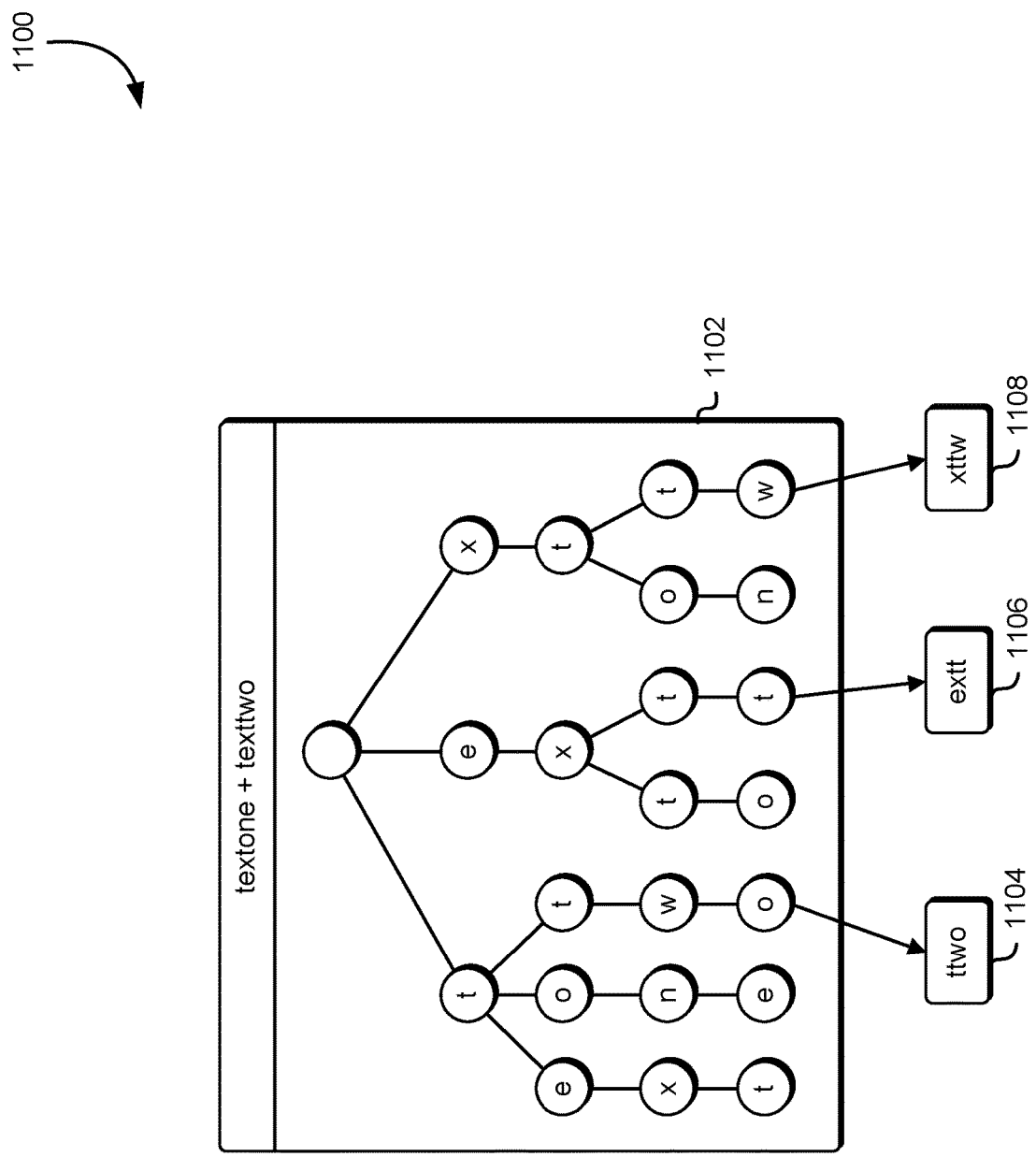
FIG. 11 illustrates an example diagram showing two tries that are merged to form a tiling trie.

FIG. 11 illustrates an example diagram 1100 showing two tries that are merged to form a tiling trie as described in connection with FIG. 1 and in accordance with an embodiment. In the example illustrated in FIG. 11, the trie indexing the data "textone" 1002 and the trie indexing the data "texttwo" 1004, both as described in connection with FIG. 10, are merged to form the tiling trie 1102 that indexes both "textone" and "texttwo." Because the substrings of "textone" are the set {"text," "exto," "xton," "tone" } and the substrings of "texttwo" are the set {"text," "extt," "xttw," "ttwo" }, the tiling trie 1102 that indexes both "textone" and "texttwo" represents the union of these two sets (i.e., the set {"text," "exto," "xton," "tone," "extt," "xttw," "ttwo" }). In the example illustrated in FIG. 11, the tiling trie 1102 that indexes both "textone" and "texttwo" 1102 is the trie indexing the data "textone" 1002 as described in connection with FIG. 10 with the substrings "ttwo" 1104, "extt" 1106, and "xttw" 1108 added. A merge operation of two tries to produce a tiling trie (or a tree of tries) is the same as adding the substrings from one trie to the other trie.

Figure 12:
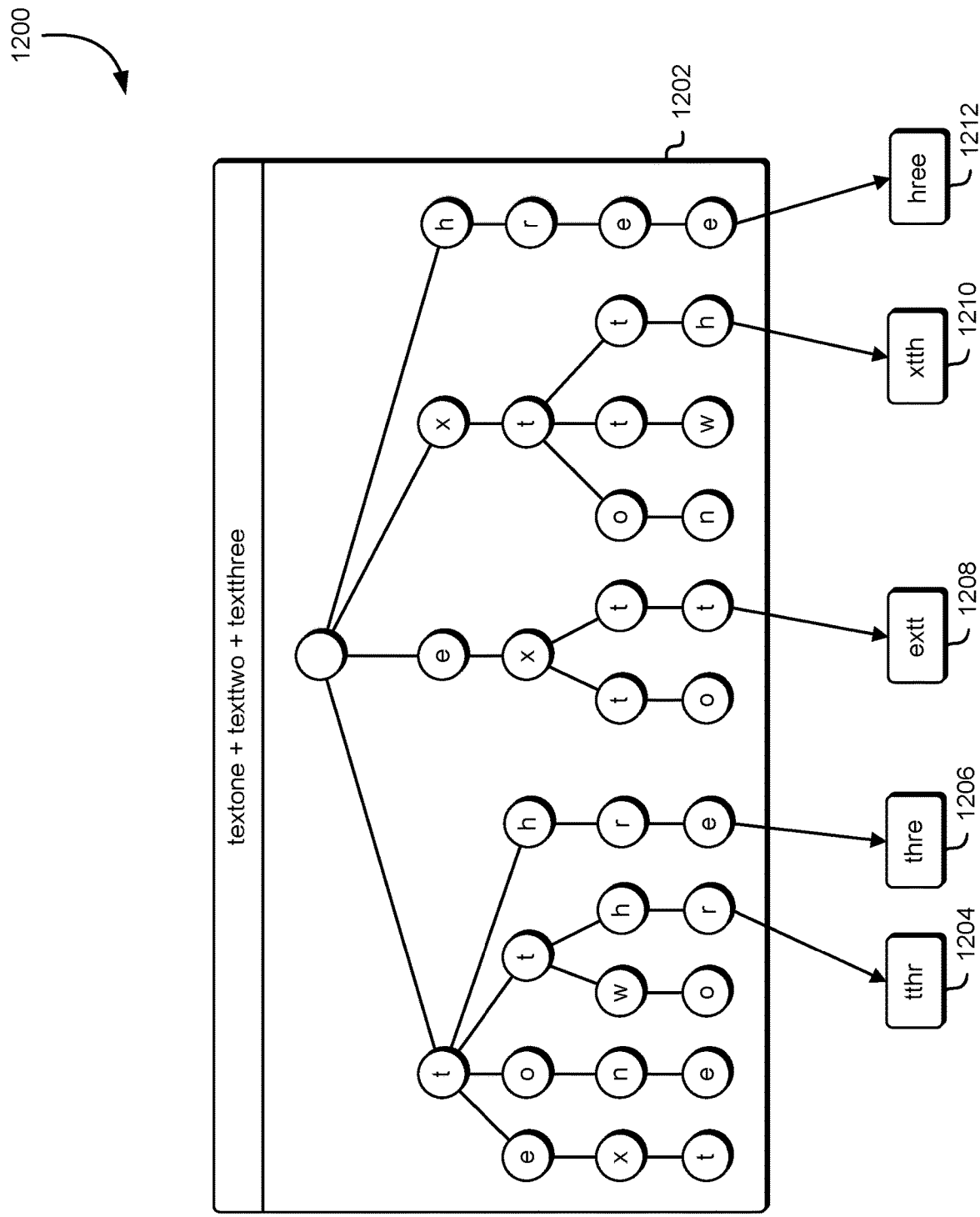
FIG. 12 illustrates an example diagram showing an additional trie that is merged into a tiling trie.

FIG. 12 illustrates an example diagram 1200 showing an additional trie that is merged into a tiling trie as described in connection with FIG. 1 and in accordance with an embodiment. In the example illustrated in FIG. 12, the trie indexing the data "textthree" 1006 as described in connection with FIG. 10, is merged with the tiling trie 1102 that indexes both "textone" and "texttwo" as described in connection with FIG. 11. The substrings of "textthree" (i.e., the set {"text," "extt," "xtth," "tthr," "thre," "hree" }) are merged with the substrings of "textone" and "texttwo" (i.e., the set {"text," "exto," "xton," "tone," "extt," "xttw," "ttwo" }) to produce the union set {"text," "exto," "xton," "tone" "extt," "xttw," "ttwo", "extt," "xtth," "tthr," "thre," "hree" }. In the example illustrated in FIG. 12, the tiling trie 1202 that indexes "textone," "texttwo," and "textthree" is the tiling trie 1102 that indexes "textone" and "texttwo" as described in connection with FIG. 11 with the substrings "tthr" 1204, "thre" 1206, "extt" 1208, "xtth" 1210, and "hree" 1212 added.

It should be noted that tries can be merged in any order and thus the tiling trie obtained by merging the trie that indexes "textone" with the trie that indexes "texttwo" and then merging that tiling trie with the trie that indexes "textthree" would index the same data and have the same nodes (albeit in a different order) as a tiling trie obtained by merging the trie that indexes "textthree" with the trie that indexes "textone" and then merging that tiling trie with the trie that indexes "textone."

In an embodiment, the tries that are merged into the tiling trie (or tree of tries) can be stored in long-term storage and can, for example, include log data or textual data from one or more days, weeks, months, or years. For example, a tree of tries can be generated for each hour of streaming log data. This tree of tries can be stored for later use and combined with 24 other trees of tries to generate a tree of tries for the day. These trees of tries for the days may be retrieved from long-term storage and used to generate a tree of tries for a week or for a month. These trees of tries may, in turn, combined together to generate a tree of tries for a year or, in an embodiment, for all available time. In such an embodiment, the trees of tries that are combined may be stored in long-term storage after being merged. The sub-trees (i.e., the trees of tries used to generate, for example, the yearly tree of tries) may also be stored in long-term storage so that, when a search of the yearly tree of tries indicates a possibility that data is in the data, the sub-trees can then be searched.

Figure 13:
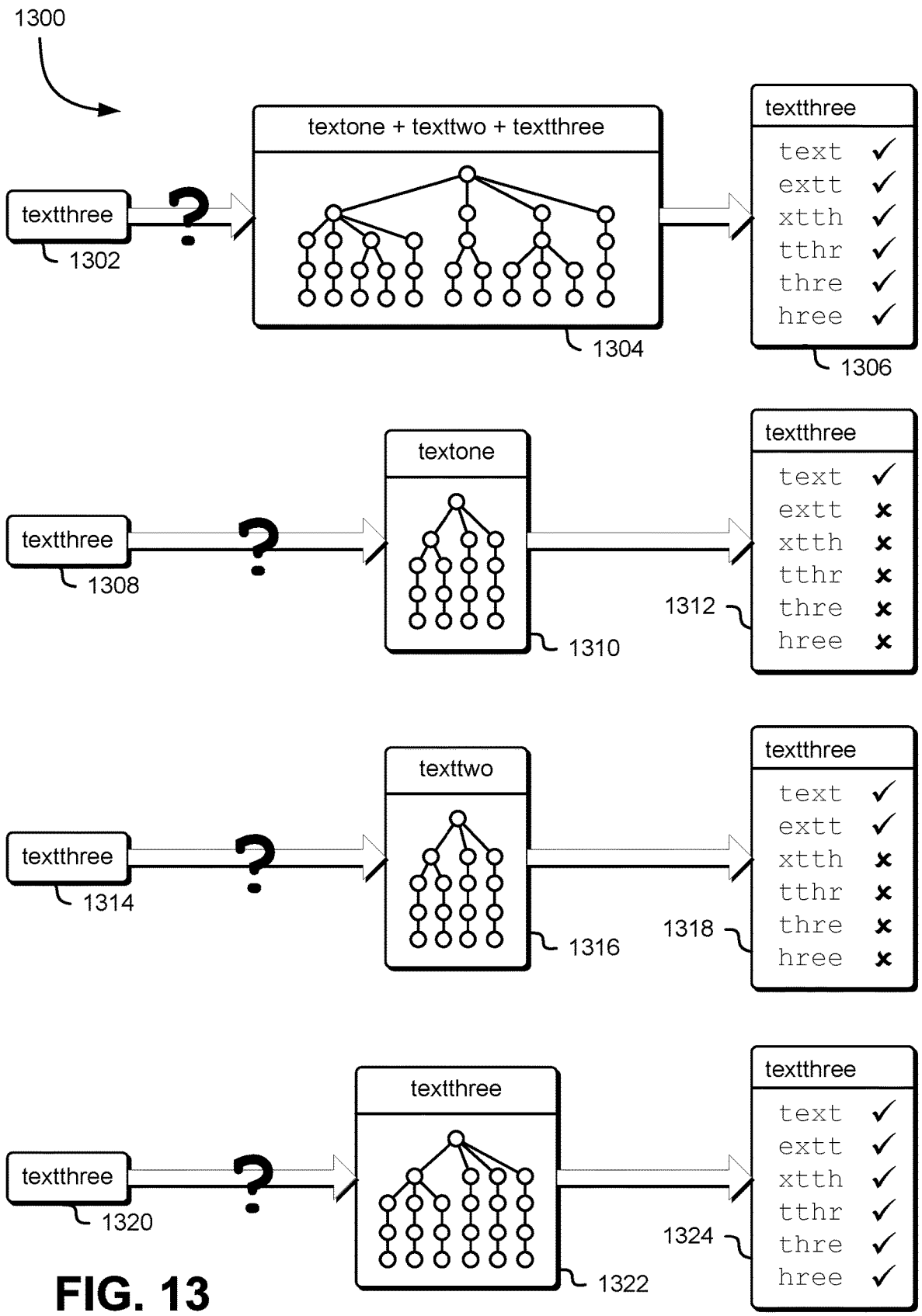
FIG. 13 illustrates an example diagram showing searches for textual data elements in a tiling trie.

FIG. 13 illustrates an example diagram 1300 showing searches for textual data elements in a tiling trie as described in connection with FIG. 1 and in accordance with an embodiment. In the example illustrated in FIG. 13, a search (represented by the arrow with the question mark) for sought data 1302 is done by searching the tiling trie 1304, which is the same as the tiling trie 1202 described in connection with FIG. 12. This search is done by searching for the substrings of length four of the sought data 1302, which is, in this case, "textthree" as described above. The substrings of length four are used because they correspond to the depth of the tiling trie 1304 as described above. The result 1306 of the search shows that the substring "text," the substring "extt," the substring "xtth," the substring "tthr," the substring "thre," and the substring "hree" are all in the tiling trie 1304, indicating a high probability (e.g., 100%) that the sought data 1302 is in the data indexed by the tiling trie 1304.

Because of the high probability that the sought data 1302 is in the data indexed by the tiling trie 1304, a more refined search is performed. In the example illustrated in FIG. 13, a search for the sought data 1308 (which is the same as the sought data 1302) is done by searching the trie 1310, which is the same as the trie 1002 described in connection with FIG. 10. The results of this search 1312 indicate that the sought data 1308 is not in the data indexed by the trie 1310 as indicated by the low probability (e.g., 16.67%) that the sought data 1308 is in the trie 1310. It should be noted that, while the examples illustrated in FIG. 13 illustrate searching the trie for each of the substrings of the sought data, the log data processing service may stop the search after the first "not found" indicator is returned (e.g., for the string "extt" of the results of the search 1312.

Similarly, a search for the sought data 1314 (which is the same as the sought data 1302) is done by searching the trie 1316, which is the same as the trie 1004 described in connection with FIG. 10. The results of this search 1318 may indicate a higher, but still low probability (e.g., 33.33%) that the sought data 1314 is in the trie 1316, but the results of the search 1318 still indicate that the sought data 1314 is not in the data indexed by the trie 1316. Finally, a search for the sought data 1320 (which is the same as the sought data 1302) is done by searching the trie 1322, which is the same as the trie 1006 described in connection with FIG. 10. The results of this search 1324 indicate a high probability (e.g., 100%) that the sought data 1320 is in the trie 1322, which in turn indicates a high likelihood that the sought data 1320 is in the data indexed by the trie 1322. The high likelihood that the sought data 1320 is in the data indexed by the trie 1322 is not a certainty because of the possibility of false positive results in such a search as described above.

In an embodiment, the search for the sought data 1308 is not done by searching the trie 1310 as illustrated in FIG. 13, but is instead done by searching the underlying data, which is, in this case, "textone." This search is done by comparing the string "textthree" of the sought data 1308 to the string "textone," the result of which would also indicate that the string "textthree" is not in the data indexed by the trie 1310. In such an embodiment, the search for the sought data 1314 is done by comparing the string "textthree" of the sought data 1314 to the string "texttwo," with the result of such a search also indicating that the string "textthree" is also not in the data indexed by the trie 1316. Similarly, in such an embodiment, the search for the sought data 1320 is done by comparing the string "textthree" of the sought data 1320 to the string "textthree," with the result of such a search also indicating that the string "textthree" is in the data indexed by the trie 1322. In another embodiment, the methods of searching for the sought data in the trie are combined with searching for the sought data in the underlying data. In such an embodiment, the choice of whether, for a particular search, to search for the sought data in the trie or in the underlying data may be based at least in part on the type of the data in the trie, the length of the sought data string, the depth of the trie, the coarseness of the trie (i.e., the number of levels of the hierarchy of the tiling trie), and other such factors.

Figure 14:
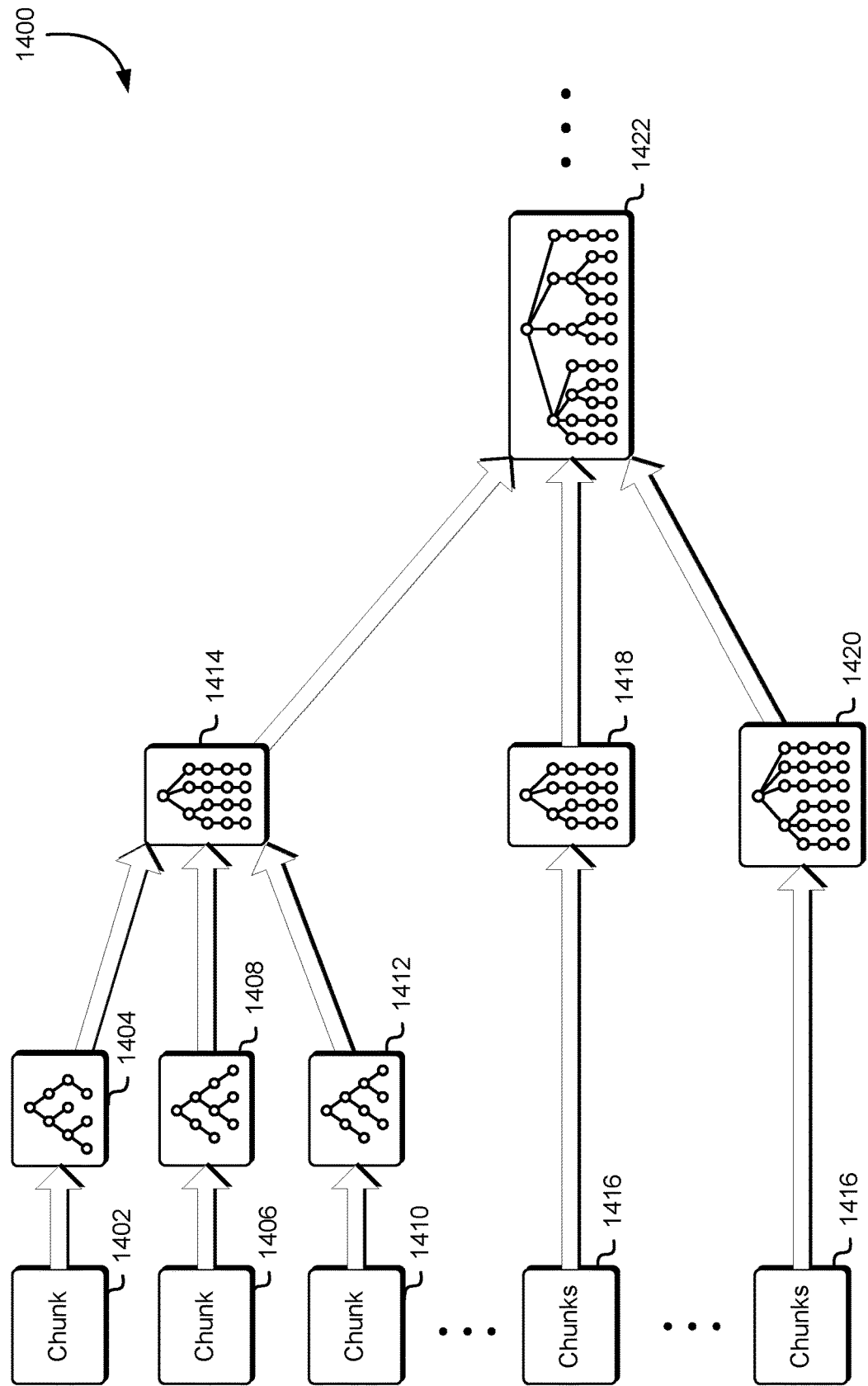
FIG. 14 illustrates an example diagram showing hierarchical merging of tiling tries.

FIG. 14 illustrates an example diagram 1400 showing hierarchical merging of tiling tries as described in connection with FIG. 1 and in accordance with an embodiment. In the example illustrated in FIG. 14, a chunk 1402 of textual data such as, for example, a log entry, is used to generate a trie 1404 as described above. Similarly, a chunk 1406 of textual data is used to generate a trie 1408 and a chunk 1410 of textual data is used to generate a trie 1412. The trie 1404, the trie 1408, and the trie 1412 are then merged to form the tiling trie 1414 that represents the chunk 1402, the chunk 1406, and the chunk 1410. A correlation between the tiling trie 1414 and the trie 1404, the trie 1408, and the trie 1412 may be maintained by, for example, storing the tiling trie 1414 with the trie 1404, the trie 1408, and the trie 1412. In an embodiment, the trie 1404, the trie 1408, and the trie 1412 are discarded and a correlation between the tiling trie 1414 and the chunk 1402, the chunk 1406, and the chunk 1410 is maintained. Similarly, chunks 1416 may be used to generate a tiling trie 1418 and a tiling trie 1420 which may, in turn be further merged into a tiling trie 1422. The merging of tiling tries at higher and higher levels (e.g., trees of trees of tries, trees of trees of trees of tries, etc.) may continue until, for example, the false positive rate of the highest level tiling trie is too high or the storage efficiency of the tiling trie falls below a threshold value.

Figure 15:
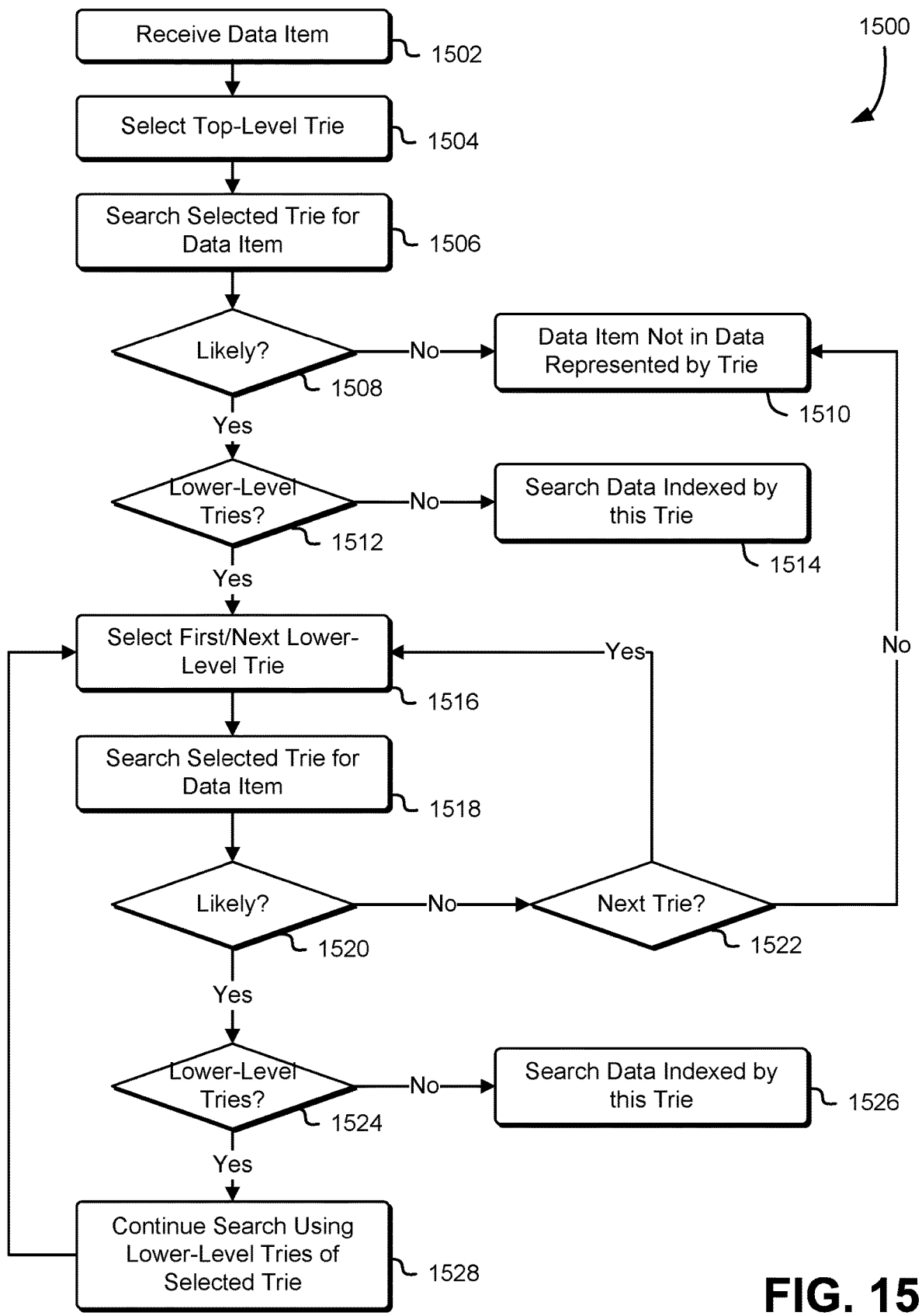
FIG. 15 illustrates an example process for performing searches for textual data elements in a tiling trie.

FIG. 15 illustrates an example process 1500 for performing searches for textual data elements in a tiling trie as described in connection with FIG. 1 and in accordance with an embodiment. A log data processing service such as the log data processing service 112 described in connection with FIG. 1 may perform the example process 1500 illustrated in FIG. 15. The log data processing service first receives 1502 a data item to search for (i.e., the sought data). The log data processing service next selects 1504 a top-level tiling trie and searches 1506 the selected trie for the data item. The search of the selected trie for the data item may be performed using, for example, the example process 900 described in connection with FIG. 9. If, as a result of the search it is not determined 1508 that it is likely that the sought data item is in the tiling trie because, for example, there is a low probability score, then the data item is not in the data indexed by the tiling trie 1510 as described above. It should be noted that a search may report false positive results because the nature of the tiling trie (i.e., the search may report a likelihood that the sought data is in the tiling trie when it is not) as described above but the search such as the search 1506 will not report false negative results. That is, a zero probability score cannot be reported if the sought data is in the data indexed by the tiling trie.

If it is determined 1508 that it is likely that the sought data is in the tiling trie then the log data processing service will determine 1512 whether there are lower-level tries to search (i.e., tries or tiling tries that were merged to produce the current tiling trie as described above). If the log data processing service does determine 1512 that there are no lower-level tries to search because, for example, the lower-level tries were discarded, then the log data processing service may directly search 1514 the data indexed by the current tiling trie. Conversely, if the log data processing service does determine 1512 that there are lower-level tries to search, then the log data processing service will select 1516 the first/next lower-level trie, search 1518 for the sought data item in the selected first/next lower level trie using, for example, the example process 900 described in connection with FIG. 9, and determine 1520 whether it is likely that the sought data item is in the first/next lower-level trie.

If the log data processing service does not determine 1520 that it is likely that the sought data is in the first/next lower-level trie, the log data processing service may determine 1522 whether there are more lower-level tries to search. If the log data processing service does determine 1522 that there are more lower-level tries to search, the log data processing service will select 1516 the next lower-level trie and continue the search. Conversely, if the log data processing service does not determine 1522 that there are more lower-level tries to search, then the data item is not likely in the data represented by the tiling trie 1510 because the sought data was not found in any of the lower-level tries.

Conversely, if the log data processing service does determine 1520 that it is likely that the sought data is in the first/next lower-level trie, the log data processing service will determine 1524 whether there are lower-level tries to search as described above. If the log data processing service does not determine 1524 that there are lower-level tries to search because, for example, the lower-level tries were discarded, then the log data processing service may directly search 1526 the data indexed by the current tiling trie. Conversely, if the log data processing service does determine 1524 that there are lower-level tries to search, then the log data processing service will continue 1528 the search using the lower-level tries of the selected trie (i.e., may continue the example process 1500 recursively starting at the step to select 1516 the first/next lower-level trie).

Figure 16:
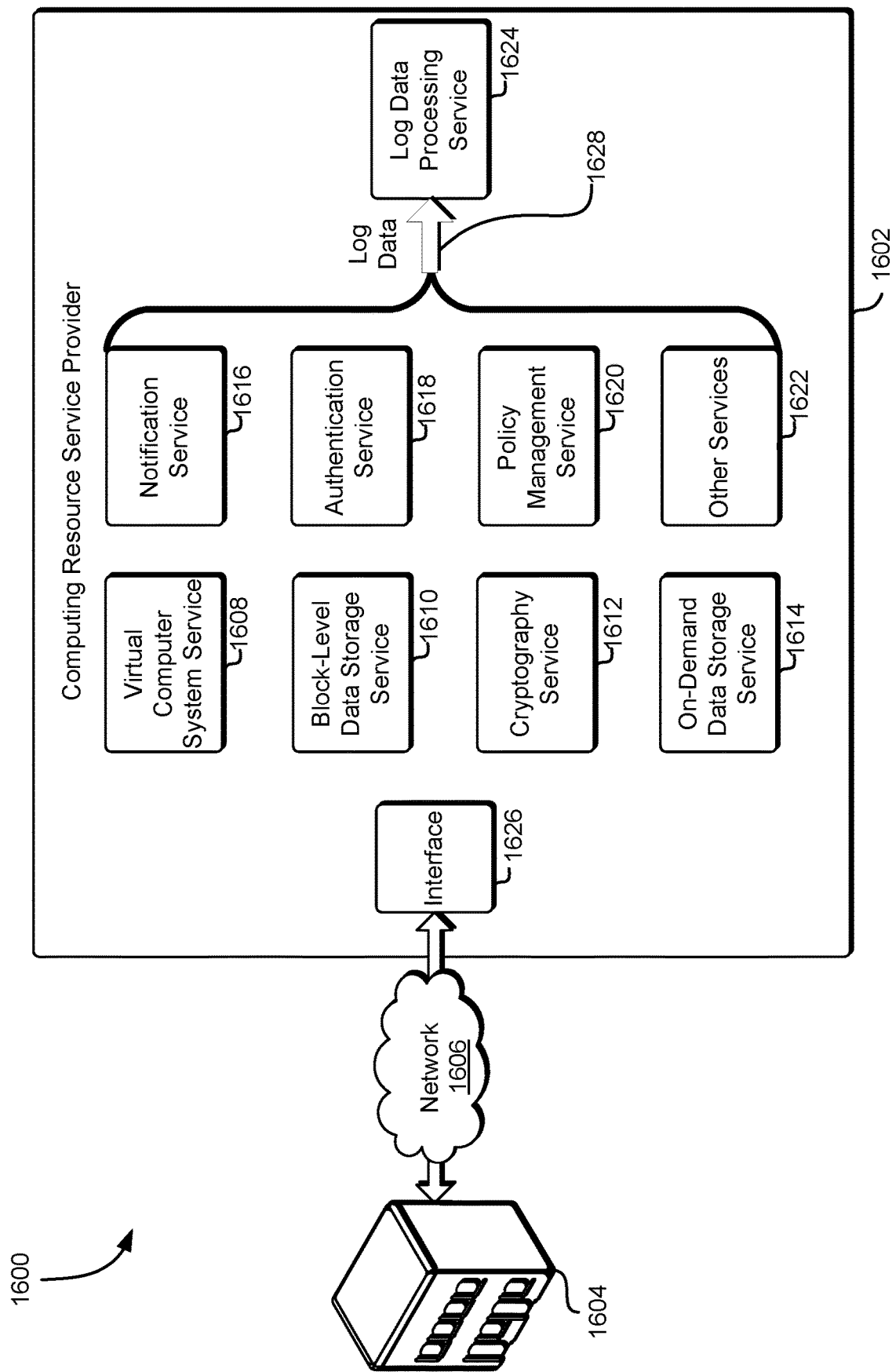
FIG. 16 illustrates an example environment where various services of a computing resource service provider generate log data that is indexed using tiling tries.

FIG. 16 illustrates an example environment 1600 where various services of a computing resource service provider generate log data that is indexed using tiling tries as described in connection with FIG. 1 and in accordance with at least one embodiment. The computing resource service provider 1602 may provide a variety of services to the customer 1604 and the customer 1604 may communicate with the computing resource service provider 1602 via an interface 1626, which may be a web services interface or any other type of customer interface. While the example environment illustrated in FIG. 16 shows one interface 1626 for the services of the computing resource service provider 1602, each service may have its own interface and, generally, subsets of the services may have corresponding interfaces in addition to or as an alternative to the interface 1626. Each of the services illustrated in FIG. 16 may communicate with a log data processing service 1624 and may provide log data 1628 and/or other such textual data to the log data processing service 1624 as described herein.

The customer 1604 may be an organization that may utilize one or more of the services provided by the computing resource service provider 1602. Additionally, the customer 1604 may be an individual that utilizes the services of the computing resource service provider 1602. As shown in FIG. 16, the customer 1604 may communicate with the computing resource service provider 1602 using a network 1606, wherein the network 1606 may be a communication network, such as the Internet, an intranet or an Internet service provider (ISP) network such as those described herein.

The computing resource service provider 1602 may provide various computing resource services to its customers. The services provided by the computing resource service provider 1602, in this example, may include a virtual computer system service 1608, a block-level data storage service 1610, a cryptography service 1612, an on-demand data storage service 1614, a notification service 1616, an authentication service 1618, a policy management service 1620, and one or more other services 1622. Not all embodiments described may include the services described with reference to FIG. 16 and additional services may be provided in addition to or as an alternative to services explicitly described. As described, each of the services 1608 through 1622 may include one or more web service interfaces that enable the customer 1604 to submit appropriately configured API calls to the various services through web service requests. In addition, each of the services may include one or more service interfaces that enable the services to access each other (e.g., to enable a virtual computer system of the virtual computer system service 1608 to store data in or retrieve data from the on-demand data storage service 1614 and/or to access one or more block-level data storage devices provided by the block-level data storage service 1610). As described above, each of these services may communicate with a log data processing service 1624 and may provide log data 1628 and/or other such textual data to the log data processing service 1624 as described herein. Using the example above, the virtual computer system of the virtual computer system service 1608 generate log entry events associated with the operations to store data in or retrieve data from the on-demand data storage service 1614 or to access one or more block-level data storage devices provided by the block-level data storage service 1610.

The virtual computer system service 1608 may be a collection of computing resources configured to instantiate virtual machine instances on behalf of the customer 1604. The customer 1604 may interact with the virtual computer system service 1608 (via appropriately configured and authenticated API calls) to provision and operate virtual computer systems that are instantiated on physical computing devices hosted and operated by the computing resource service provider 1602. The virtual computer systems and/or the virtual computer system service 1608 may provide log data 1628 the log data processing service 1624 such as, for example, log data relating to startup, shutdown, errors, and other such virtual machine operations. This log data may then be used to generate tiling tries which may, in turn, be used to search for log entries in the log data using the indexing provided by the tiling tries. The virtual computer systems of the virtual computer system service 1608 may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 1608 is shown in FIG. 16, any other computer system or computer system service may be utilized in the computing resource service provider 1602, such as a computer system or computer system service that does not employ virtualization or instantiation and instead provisions computing resources on dedicated or shared computers/servers and/or other physical devices.

The block-level data storage service 1610 may comprise one or more computing resources that collectively operate to store data for a customer 1604 using block-level storage devices (and/or virtualizations thereof). The block-level storage devices of the block-level data storage service 1610 may, for instance, be operationally attached to virtual computer systems provided by the virtual computer system service 1608 to serve as logical units (e.g., virtual drives) for the computer systems. The block-level storage devices and/or the block-level data storage service 1610 may provide log data 1628 the log data processing service 1624 related to the operation of the block-level storage devices and/or to the block-level storage service so that log data may be used to generate the tiling tries which may, in turn, be used to search for log entries in the log data using the indexing provided by the tiling tries. A block-level storage device may enable the persistent storage of data used/generated by a corresponding virtual computer system where the virtual computer system service 1608 may only provide ephemeral data storage.

The computing resource service provider 1602 may also provide a cryptography service 1612. The cryptography service 1612 may generate cryptographic keys for use within the system and may, in an embodiment, utilize one or more storage services of the computing resource service provider 1602 to store keys of the customers in encrypted form, whereby the keys may be usable to decrypt customer 1604 keys accessible only to particular devices of the cryptography service 1612. The cryptography service 1612 may provide log data 1628 the log data processing service 1624 so that log data related to, for example, generating and storing such keys may be used to generate tiling tries which may, in turn, be used to search for log entries in the log data as described herein. The block-level storage devices and/or the block-level data storage service 1610 may provide additional log data 1628 to the log data processing service 1624 related to storing such keys that may be used to generate the tiling tries to index the log data.

The computing resource service provider 1602 further includes an on-demand data storage service 1614. The on-demand data storage service 1614 may be a collection of computing resources configured to synchronously process requests to store and/or access data. As with the above services, the on-demand data storage service 1614 may generate log data 1628 related to, for example, the operation of the on-demand data storage service 1614 which may be used to generate the tiling tries as described herein. The on-demand data storage service 1614 may operate using computing resources (e.g., databases) that enable the on-demand data storage service 1614 to locate and retrieve data quickly, to allow data to be provided in responses to requests for the data. For example, the on-demand data storage service 1614 may maintain stored data in a manner such that, when a request for a data object is retrieved, the data object can be provided (or streaming data object can be initiated) in a response to the request. As noted, data stored in the on-demand data storage service 1614 may be organized into data objects. The data objects may have arbitrary sizes except, perhaps, for certain constraints on size. Thus, the on-demand data storage service 1614 may store numerous data objects of varying sizes. The on-demand data storage service 1614 may operate as a key value store that associates data objects with identifiers of the data objects that may be used by the customer 1604 to retrieve or perform other operations in connection with the data objects stored by the on-demand data storage service 1614. Each of these operations may generate additional log data 1628 which may be used by the log data processing service 1624 to generate the tiling tries as described herein.

In the environment illustrated in FIG. 16, a notification service 1616 is included. The notification service 1616 may comprise a collection of computing resources collectively configured to provide a web service or other interface and a browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1616 may provide notifications to clients using a "push" mechanism without the need to check periodically or "poll" for new information and updates. The notification service 1616 may further be used for various purposes such as monitoring applications executing in the virtual computer system service 1608, workflow systems, time-sensitive information updates, mobile applications, and many others. As with the previously described services, the notification service 1616 may provide log data 1628 to the log data processing service 1624 is used to generate tiling tries which may, in turn, be used to index the log data.

As illustrated in FIG. 16, the computing resource service provider 1602, in various embodiments, includes an authentication service 1618 and a policy management service 1620. The authentication service 1618, in an embodiment, is a computer system (i.e., collection of computing resources) configured to perform operations involved in authentication of users of the customer. For instance, one of the services 1608 through 1616 and/or 1620 through 1622 may provide information from a user to the authentication service 1618 to receive information in return that indicates whether the user requests are authentic.

The policy management service 1620, in an embodiment, is a computer system configured to manage policies on behalf of customers (such as customer 1604) of the computing resource service provider 1602. The policy management service 1620 may include an interface that enables customers to submit requests related to the management of policy. Such requests may, for instance, be requests to add, delete, change, or otherwise modify policy for a customer or for other administrative actions, such as providing an inventory of existing policies and the like. The authentication service 1618 and/or the policy management service 1620 may also provide log data 1628 to the log data processing service 1624 that is used to generate tiling tries which may, in turn, be used to index the log data.

The computing resource service provider 1602 additionally maintains one or more other services 1622 based at least in part on the needs of its customers 1604. For instance, the computing resource service provider 1602 may maintain a database service for its customers 1604. A database service may be a collection of computing resources that collectively operate to run one or more databases for one or more customers. The customer 1604 may operate and manage a database from the database service by utilizing appropriately configured API calls. This, in turn, may allow a customer 1604 to maintain and potentially scale the operations in the database. Other services 1622 may include, but may not be limited to, object-level archival data storage services and services that manage and/or monitor other services. Each of these other services 1622 may also provide log data 1628 to the log data processing service 1624 that is used to generate tiling tries which may, in turn, be used to index the log data as described herein.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 17:
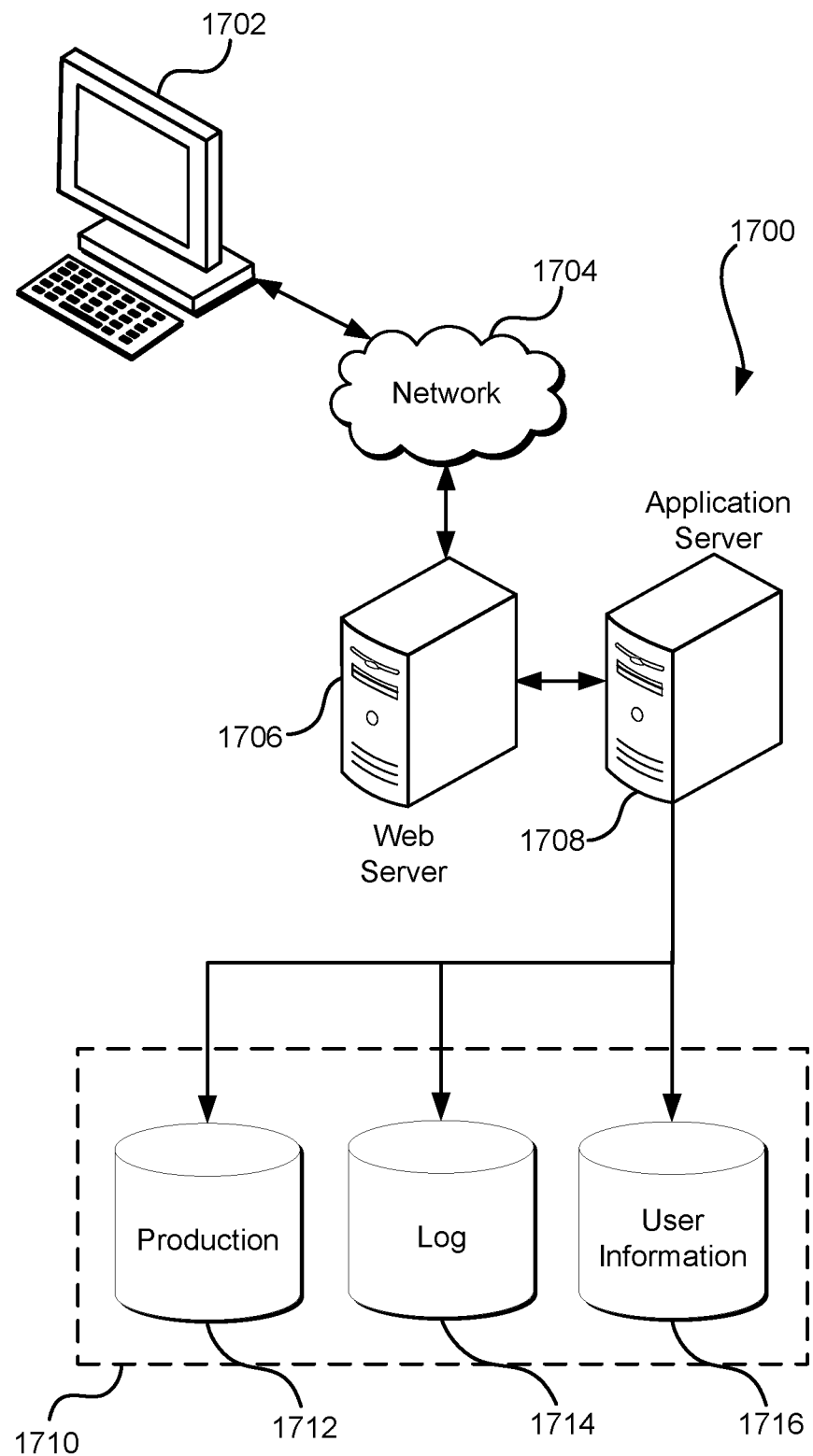
FIG. 17 illustrates an environment in which various embodiments can be implemented.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages, or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the electronic client device 1702 and the application server 1708, can be handled by the web server using PUP: Hypertext Preprocessor ("PUP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1710 can include several separate data tables, databases, data documents, dynamic data storage schemes, and/or other data storage mechanisms and media for storing data relating to a particular aspect of the present disclosure. For example, the data store illustrated may include mechanisms for storing production data 1712 and user information 1716, which can be used to serve content for the production side. The data store also is shown to include a mechanism for storing log data 1714 such as the log data described herein, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. The application server 1708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on a user device such as the electronic client device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system in the example environment 1700 in FIG. 17 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PUP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a set of log data, the set of log data including textual data;
extracting a set of strings from the textual data, based at least in part on a chunk size parameter;
processing a subset of strings of the set of strings by at least:
normalizing the subset of strings by at least removing a first subset of characters of a set of characters representing data included in the subset of strings to generate a normalized subset of strings; and
generating a trie, based at least in part on a trie depth and the chunk size parameter, indexing a first string of the normalized subset of strings by at least inserting into a first node of the trie a first character of the first string and inserting into a set of child nodes of the first node a set of substrings of the first string corresponding to the first character, the set of substrings having a substring length not more than the trie depth;
performing at least one merging operation of a set of merging operations to generate a tree of tries, of which the trie is a member, until a false positive metric passes a threshold, the false positive metric indicating a likelihood that a query of the set of log data returns a result that indicates a log entry is a member of the tree of tries despite not being a member, by at least:
increasing the trie depth associated with the tree of tries; and
performing a union of the set of child nodes of the trie and at least one other set of child nodes of at least one other trie of a set of tries included in the tree of tries;
in response to the false positive metric passing the threshold, searching for the log entry in the tree of tries; and
reporting information that indicates whether the log entry is in the tree of tries.

2. The computer-implemented method of claim 1, wherein the chunk size parameter corresponds to a single log entry.

3. The computer-implemented method of claim 1, wherein as a result of the information indicating that the log entry is in the tree of tries, searching for the log entry in log data indexed by a trie in the tree of tries.

4. The computer-implemented method of claim 1, wherein the tree of tries includes a plurality of trees of tries, a first tree of tries of the plurality of trees of tries including the set of tries and selected based at least in part on a time interval associated with the first tree of tries.

5. A system, comprising:
one or more processors; and
memory that stores computer-executable instructions that, as a result of being executed, cause the one or more processors to:
extract a subset of textual data of a set of textual data based at least in part on a chunk size parameter;
normalize the subset of textual data by at least modifying an alphabet representing data included in the set of textual data to generate a normalized subset of textual data;
generate a first probabilistic data structure that indexes the normalized subset of textual data, the first probabilistic data structure generated based at least in part on the normalized subset of textual data and the chunk size parameter by at least inserting a first string of the normalized subset of textual data into a root node and a substring of the first string into a child node;
perform at least one merging operation of a set of merging operations to combine a set of first probabilistic data structures of which the first probabilistic data structure is a member into a second probabilistic data structure that indexes the normalized subset of textual data, such that a false positive metric passes a lower bound of a likelihood that a search for a data item returns information that indicates the data item is a member of the set of textual data despite not being a member, by at least:
increasing a compression rate of the second probabilistic data structure, where the compression rate is determined based at least in part on a depth parameter associated with the second probabilistic data structure, the depth parameter indicating a substring length of nodes of the second probabilistic data structure, where increasing the substring length causes the compression rate to pass the lower bound by at least reducing the likelihood that the search for the data item returns information that indicates the data item is in the set of textual data despite not being in the set of textual data; and
combining the set of first probabilistic data structures by at least merging nodes of the set of first probabilistic data structures based at least in part on the depth parameter;
receive a request to search for the data item in the set of textual data; and
provide a response to the request based at least in part on a result of searching for the data item in the second probabilistic data structure.

6. The system of claim 5, wherein the first probabilistic data structure is a trie.

7. The system of claim 5, wherein the second probabilistic data structure is a tree of the first probabilistic data structure.

8. The system of claim 5, wherein the set of textual data is a set of log data.

9. The system of claim 5, wherein the set of textual data is a set of streaming data.

10. The system of claim 5, wherein the memory further includes instructions that, as a result of being executed, cause the one or more processors to discard the first probabilistic data structure of the set of first probabilistic data structures after combining the first probabilistic data structure into the second probabilistic data structure.

11. The system of claim 10, wherein the likelihood that the search for the data item returns the information that indicates the data item is within the set of textual data despite not being within the set of textual data is further based at least in part on the false positive metric of the second probabilistic data structure.

12. The system of claim 5, wherein the second probabilistic data structure includes metadata indicating a frequency count of elements in the second probabilistic data structure, the frequency count based at least in part on a number of occurrences of elements in the set of textual data.

13. A non-transitory computer-readable storage medium storing thereon executable instructions that, as a result of being executed by one or more processors of a computer system, cause the computer system to at least:
- generate a normalized set of textual data by at least modifying an alphabet corresponding to a set of textual data;
- generate a tree of probabilistic data structures that indexes the normalized set of textual data by at least inserting into a root node a first string of the normalized set of textual data and into a child node a substring of the first string, where the tree of probabilistic data structures has a first depth determined based at least in part on a first substring length of the first string, members of the tree of probabilistic data structures comprising substrings of the normalized set of textual data of the first substring length;
- generate an indication that a search string is in the set of textual data by at least searching the tree of probabilistic data structures to determine the search string is in the set of textual data;
- determine, based at least in part on the indication that the search string is in the set of textual data, a set of locations in the set of textual data of the search string;
- determine a set of false positive results based at least in part on searching the set of locations in the set of textual data for the search string;
- reduce the set of false positive results until the set of values passes a threshold indicating a likelihood that a search of the tree of probabilistic data structures returns information indicating the set of locations in the set of textual data of the search string despite the set of textual data not including the search string by at least performing at least one merging operation of a set of merging operations, where the at least one merging operation includes:
  - modifying the first depth associated with the tree of probabilistic data structures to a second depth associated with the tree of probabilistic data structures; and
  - performing a union of probabilistic data structures of the tree of probabilistic data structures until the second depth is reached by at least causing the first substring length to be modified to a second substring length such that the set of values indicated by the set of false positive results is reduced to a subset of values of the set of values; and
- report the indication and the set of locations in the set of textual data including the search string.

14. The non-transitory computer-readable storage medium of claim 13, wherein the instructions that cause the computer system to generate the tree of probabilistic data structures further comprise instructions that, as a result of being executed by the one or more processors, cause the computer system to at least:
- select a plurality of probabilistic data structures of the tree of probabilistic data structures;
- merge the plurality of probabilistic data structures into a new probabilistic data structure; and
- replace the plurality of probabilistic data structures of the tree of probabilistic data structures with the new probabilistic data structure.

15. The non-transitory computer-readable storage medium of claim 14, wherein the plurality of probabilistic data structures of the tree of probabilistic data structures is selected based at least in part on a subset of false positive results of the set of false positive results associated with the plurality of probabilistic data structures for the tree of probabilistic data structures.

16. The non-transitory computer-readable storage medium of claim 14, wherein the instructions further comprise instructions that, as a result of being executed by the one or more processors, cause the computer system to discard a probabilistic data structure of the plurality of probabilistic data structures.

17. The non-transitory computer-readable storage medium of claim 13, wherein the instructions that cause the computer system to generate the tree of probabilistic data structures further comprise instructions that, as a result of being executed by the one or more processors, cause the computer system to at least:
- extract a string from the set of textual data, the string data having a string length equal to a chunk size parameter of the tree of probabilistic data structures;
- normalize the string by at least:
  - removing one or more characters of a first classification from the string; and
  - converting a case of the textual data, based at least in part on a case parameter of the tree of probabilistic data structures; and
- generate a probabilistic data structure that indexes the string, the probabilistic data structure generated by inserting a substring of the string data into the probabilistic data structure having a substring length based at least in part on a parameter of the probabilistic data structure.

18. The non-transitory computer-readable storage medium of claim 13, wherein the indication that the search string is in the set of textual data is based at least in part on searching a probabilistic data structure of the tree of probabilistic data structures for the search string.

19. The non-transitory computer-readable storage medium of claim 18, wherein the set of locations in the set of textual data of the search string is based at least in part on searching the probabilistic data structure of the tree of probabilistic data structures for the search string.

20. The non-transitory computer-readable storage medium of claim 13, wherein the probabilistic data structures of the tree of probabilistic data structures are tries.

21. The non-transitory computer-readable storage medium of claim 13, wherein the indication includes at least one of: a first indication that the search string is not in the set of textual data, a second indication that the search string might be in the set of textual data, and a third indication that the search string is in the set of textual data.

* * * * *